US012612514B2

(12) United States Patent
Nagaoka et al.

(10) Patent No.: US 12,612,514 B2
(45) Date of Patent: Apr. 28, 2026

(54) METHOD FOR PRODUCING RESIN COMPOSITION, AND RESIN COMPOSITION

(71) Applicant: KANEKA CORPORATION, Osaka (JP)

(72) Inventors: Yu Nagaoka, Hyogo (JP); Tomoaki Ashida, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 1010 days.

(21) Appl. No.: 17/485,782

(22) Filed: Sep. 27, 2021

(65) Prior Publication Data

US 2022/0010123 A1     Jan. 13, 2022

Related U.S. Application Data

(63) Continuation of application No. PCT/JP2020/014659, filed on Mar. 30, 2020.

(30) Foreign Application Priority Data

Mar. 28, 2019    (JP) ................................. 2019-063425

(51) Int. Cl.
*C08L 51/04*       (2006.01)
*C08L 63/00*       (2006.01)

(52) U.S. Cl.
CPC ............... *C08L 51/04* (2013.01); *C08L 63/00* (2013.01); *C08L 2203/30* (2013.01)

(58) Field of Classification Search
CPC ............. C08L 51/04; C08L 63/00; C08F 6/22
See application file for complete search history.

(56) References Cited

U.S. PATENT DOCUMENTS

| | | |
|---|---|---|
| 3,284,396 A | 11/1966 | Talalay |
| 3,804,735 A | 4/1974 | Radlove et al. |
| 4,778,851 A | 10/1988 | Henton et al. |
| 5,290,857 A | 3/1994 | Ashida et al. |
| 5,362,795 A | 11/1994 | Matsumoto et al. |
| 5,364,729 A | 11/1994 | Kmiecik-Lawrynowicz et al. |
| 5,414,045 A | 5/1995 | Sue et al. |
| 5,569,709 A | 10/1996 | Sue et al. |
| 6,153,694 A | 11/2000 | Miyatake et al. |
| 2002/0013438 A1 | 1/2002 | Grootaert et al. |
| 2002/0052429 A1 | 5/2002 | Weier et al. |
| 2002/0065343 A1 | 5/2002 | Jang et al. |
| 2003/0040555 A1 | 2/2003 | Sakabe |
| 2004/0018240 A1 | 1/2004 | Ohmachi et al. |
| 2004/0147668 A1 | 7/2004 | Miyake et al. |
| 2004/0171749 A1 | 9/2004 | Takaki et al. |
| 2005/0163925 A1 | 7/2005 | Sacripante et al. |
| 2006/0241045 A1 | 10/2006 | Ohmachi et al. |
| 2007/0027233 A1 | 2/2007 | Yamaguchi et al. |
| 2007/0027263 A1 | 2/2007 | Furukawa et al. |
| 2007/0251419 A1 | 11/2007 | Yamaguchi et al. |
| 2007/0270539 A1 | 11/2007 | Yui et al. |

| | | |
|---|---|---|
| 2007/0272119 A1 | 11/2007 | Ichinose et al. |
| 2008/0108750 A1 | 5/2008 | Terada et al. |
| 2008/0139697 A1 | 6/2008 | Ueda |
| 2008/0146687 A1 | 6/2008 | Ueda |
| 2008/0167402 A1 | 7/2008 | Ueda |
| 2008/0176974 A1 | 7/2008 | Ueda |
| 2009/0294057 A1 | 12/2009 | Liang et al. |
| 2010/0204404 A1 | 8/2010 | Hongo |
| 2010/0323022 A1 | 12/2010 | Hashimoto et al. |
| 2011/0269894 A1 | 11/2011 | Miyamoto |
| 2011/0288201 A1 | 11/2011 | Gottis |
| 2012/0070482 A1 | 3/2012 | Heming et al. |
| 2012/0101216 A1 | 4/2012 | Achten et al. |
| 2012/0142820 A1 | 6/2012 | Yamaguchi et al. |
| 2012/0142863 A1 | 6/2012 | Miyamoto |
| 2012/0202080 A1 | 8/2012 | Ehara et al. |
| 2014/0124986 A1 | 5/2014 | Lima et al. |
| 2014/0213729 A1 | 7/2014 | Hongo |
| 2015/0037497 A1 | 2/2015 | Lutz |
| 2015/0267048 A1 | 9/2015 | Wakita et al. |

(Continued)

FOREIGN PATENT DOCUMENTS

| | | |
|---|---|---|
| CN | 1090861 A | 8/1994 |
| CN | 1409727 A | 4/2003 |

(Continued)

OTHER PUBLICATIONS

Epikote 828 Technical Data sheet (Year: 2007).*
Dow GMA Product Datasheet (Year: 2024).*
Sigma Aldrich Thermal Transitions of Homopolymers_Glass Transition & Melting Point (Year: 2024).*
Google Translation of KR 20150040497 (Year: 2025).*
International Preliminary Report on Patentability issued in related International Application No. PCT/JP2020/014657 mailed Oct. 7, 2021 (8 pages).
International Search Report issued in related International Application No. PCT/JP2020/014657 mailed Jun. 16, 2020 (2 pages).
International Preliminary Report on Patentability issued in related International Application No. PCT/JP2020/014659 mailed Oct. 7, 2021 (7 pages).
International Search Report issued in related International Application No. PCT/JP2020/014659 mailed Jun. 16, 2020 (2 pages).

(Continued)

*Primary Examiner* — Michael M Dollinger
(74) *Attorney, Agent, or Firm* — Osha Bergman Watanabe & Burton LLP

(57) ABSTRACT

A resin composition is produced by a method including a washing step of washing a resin composition with water. The resin composition contains fine polymer particles (A) and a resin (B). The fine polymer particles (A) have a graft part that is constituted by a polymer containing, as one or more structural units, one or more structural units derived from at least one type of monomer selected from the group consisting of aromatic vinyl monomers, vinyl cyanide monomers, and (meth)acrylate monomers. The resin (B) has a given viscosity, in a case where a total amount of the fine polymer particles (A) and the resin (B) is regarded as 100% by weight, an amount of the fine polymer particles (A) being 1% by weight to 70% by weight and an amount of the resin (B) being 30% by weight to 99% by weight.

6 Claims, No Drawings

(56) References Cited

U.S. PATENT DOCUMENTS

| | | | |
|---|---|---|---|
| 2016/0177016 A1 | 6/2016 | Takamido | |
| 2016/0244603 A1 | 8/2016 | Okamoto | |
| 2016/0251510 A1 | 9/2016 | Furukawa et al. | |
| 2016/0333130 A1 | 11/2016 | Wakita et al. | |
| 2016/0362524 A1 | 12/2016 | Watanabe et al. | |
| 2017/0210897 A1 | 7/2017 | Nakamoto et al. | |
| 2017/0309955 A1 | 10/2017 | Kataoka et al. | |
| 2017/0335097 A1 | 11/2017 | Takamizu | |
| 2017/0362368 A1 | 12/2017 | Kitayama et al. | |
| 2017/0362395 A1 | 12/2017 | Inoubli et al. | |
| 2017/0369696 A1 | 12/2017 | Inoubli et al. | |
| 2018/0002520 A1* | 1/2018 | Inoubli | C08J 3/12 |
| 2018/0030240 A1 | 2/2018 | Matsuoka et al. | |
| 2018/0094176 A1* | 4/2018 | Okamoto | C09J 175/08 |
| 2018/0370125 A1* | 12/2018 | Rolland | B29C 64/129 |
| 2019/0040182 A1 | 2/2019 | Miyatake | |
| 2019/0233635 A1 | 8/2019 | Inoubli et al. | |
| 2020/0095385 A1 | 3/2020 | Yoshihara | |
| 2020/0172720 A1 | 6/2020 | Kitayama et al. | |
| 2020/0303771 A1 | 9/2020 | Kataoka et al. | |
| 2022/0213311 A1 | 7/2022 | Maizuru et al. | |

FOREIGN PATENT DOCUMENTS

| | | | | |
|---|---|---|---|---|
| CN | 1503823 A | 6/2004 | | |
| CN | 1517400 A | 8/2004 | | |
| CN | 101090943 A | 12/2007 | | |
| CN | 104755516 A | 7/2015 | | |
| CN | 105452316 A | 3/2016 | | |
| CN | 105612215 A | 5/2016 | | |
| CN | 105612218 A | 5/2016 | | |
| CN | 105683238 A | 6/2016 | | |
| CN | 107250259 A | 10/2017 | | |
| EP | 0526895 A2 | 2/1993 | | |
| EP | 1245584 A1 | 10/2002 | | |
| EP | 1394210 A1 | 3/2004 | | |
| EP | 1440997 A1 | 7/2004 | | |
| EP | 1780239 A1 | 5/2007 | | |
| EP | 2123711 A1 | 11/2009 | | |
| EP | 2189502 A1 | 5/2010 | | |
| EP | 2388280 A1 | 11/2011 | | |
| EP | 2441784 A1 | 4/2012 | | |
| EP | 3031836 A1 | 6/2016 | | |
| EP | 3056540 A1 | 8/2016 | | |
| EP | 3064520 A1 | 9/2016 | | |
| EP | 3266827 A1 | 1/2018 | | |
| EP | 3587491 A1 | 1/2020 | | |
| EP | 3904453 A1 | 11/2021 | | |
| JP | H05-295237 A | 11/1993 | | |
| JP | H05-339471 A | 12/1993 | | |
| JP | H06-100704 A | 4/1994 | | |
| JP | H06172734 A | 6/1994 | | |
| JP | H06287410 A | 10/1994 | | |
| JP | H07-146587 A | 6/1995 | | |
| JP | H07-233204 A | 9/1995 | | |
| JP | H08-183836 A | 7/1996 | | |
| JP | 2000-178405 A | 6/2000 | | |
| JP | 2001-123052 A | 5/2001 | | |
| JP | 2002-146214 A | 5/2002 | | |
| JP | 2002-308914 A | 10/2002 | | |
| JP | 2003-522232 A | 7/2003 | | |
| JP | 2003-327912 A | 11/2003 | | |
| JP | 2005-002345 A | 1/2005 | | |
| JP | 2005-213507 A | 8/2005 | | |
| JP | 2005-526165 A | 9/2005 | | |
| JP | 2009062389 A | 3/2009 | | |
| JP | 2009-203397 A | 9/2009 | | |
| JP | 2009-545656 A | 12/2009 | | |
| JP | 2010-77379 A | 4/2010 | | |
| JP | 2010-209164 A | 9/2010 | | |
| JP | 2010-241996 A | 10/2010 | | |
| JP | 2011-032435 A | 2/2011 | | |
| JP | 4671531 B2 | 4/2011 | | |
| JP | 2012-520909 A | 9/2012 | | |
| JP | 2014-141604 A | 8/2014 | | |
| JP | 2015-514140 A | 5/2015 | | |
| JP | 2015-182248 A | 10/2015 | | |
| JP | 2015-218317 A | 12/2015 | | |
| JP | 2016-199673 A | 12/2016 | | |
| JP | 2017-149887 A | 8/2017 | | |
| JP | 2018-500440 A | 1/2018 | | |
| JP | 2018-500441 A | 1/2018 | | |
| JP | 2018-035210 A | 3/2018 | | |
| JP | 2019-019236 A | 2/2019 | | |
| JP | 2019503891 A | 2/2019 | | |
| JP | 2020-144374 A | 9/2020 | | |
| JP | 2021-088632 A | 6/2021 | | |
| KR | 20150040497 A | * 4/2015 | C08G 59/18 | |
| WO | 03/097746 A1 | 11/2003 | | |
| WO | 2004/108825 A1 | 12/2004 | | |
| WO | 2005/028546 A1 | 3/2005 | | |
| WO | 2005/056624 A1 | 6/2005 | | |
| WO | 2005/116155 A1 | 12/2005 | | |
| WO | 2009/034966 A1 | 3/2009 | | |
| WO | 2009/060819 A1 | 5/2009 | | |
| WO | 2010/082482 A1 | 7/2010 | | |
| WO | 2010/143366 A1 | 12/2010 | | |
| WO | 2011016385 A1 | 2/2011 | | |
| WO | 2011/046086 A1 | 4/2011 | | |
| WO | 2016-068239 A1 | 5/2016 | | |
| WO | 2016068329 A1 | 5/2016 | | |
| WO | 2016/102658 A1 | 6/2016 | | |
| WO | 2016/102666 A1 | 6/2016 | | |
| WO | 2016/102682 A1 | 6/2016 | | |
| WO | 2016/136726 A1 | 9/2016 | | |
| WO | WO-2017179653 A1 * | 10/2017 | C08G 59/18 | |
| WO | 2018/155677 A1 | 8/2018 | | |
| WO | 2018/212064 A1 | 11/2018 | | |
| WO | 2018/212227 A1 | 11/2018 | | |
| WO | 2021/060482 A1 | 4/2021 | | |

OTHER PUBLICATIONS

International Preliminary Report on Patentability issued in related International Application No. PCT/JP2020/014658 mailed Oct. 7, 2021 (10 pages).

International Search Report issued in related International Application No. PCT/JP2020/014658 mailed Jun. 30, 2020 3 pages).

Extended European Search Report issued in European Application No. 20777366.4 mailed on Nov. 15, 2022 (6 pages).

Extended European Search Report issued in European Application No. 20779224.3 mailed on Nov. 18, 2022 (7 pages).

U.S. Appl. No. 17/486,036.

U.S. Appl. No. 17/486,166.

Hexion Inc., "Product Selector" 2017, literature code HXN-152 (16 pages).

Office Action issued in related U.S. Appl. No. 17/036,869 dated Aug. 10, 2022 (39 pages).

Hexion "EPON Resin 1002F", Aubust 4, 2022 (2 pages).

Hexion "EPI-REZ Resin 3522-W-60", Aug. 4, 2022 (2 pages).

Burkhardt, "Liquid Polysulfide Polymers for Chemical- and Solvent-Resistant Sealants", www.adhesivesmag.com, Aug. 2018, p. 19-23 (6 pages).

Dow, "D.E.R. 332", Oct. 2001 (2 pages).

Office Action issued in related U.S. Appl. No. 17/036,869 dated Mar. 2, 2022 (44 pages).

Extended European Search Report issued in related European Application No. 19775340.3 mailed Dec. 15, 2021 (8 pages).

International Preliminary Report on Patentability issued in related International Application No. PCT/JP2019/013710 mailed Oct. 15, 2020 (11 pages).

International Search Report issued in related International Application No. PCT/JP2019/013710 mailed Jun. 18, 2019 (2 pages).

Written Opinion issued in related International Application No. PCT/JP2020/036313 mailed Dec. 1, 2020 (7 bages).

International Search Report issued in related International Application No. PCT/JP2020/036313 mailed Dec. 1, 2020 (4 pages).

Office Action issued in Chinese Application No. 202080024033.3; Dated Oct. 26, 2023 (7 pages).

(56)                 References Cited

OTHER PUBLICATIONS

Advisory Action issued in U.S. Appl. No. 17/036,869; Dated Nov. 2, 2023 (9 pages).
Office Action issued in corresponding Japanese Patent Application No. 2021-509698, dated Feb. 27, 2024 (4 pages).
Office Action issued in corresponding Chinese Patent Application No. 202080062288.9, dated Mar. 20, 2024 (19 pages).
Office Action issued in related U.S. Appl. No. 17/036,869 dated Jul. 10, 2023 (40 pages).
Office Action issued in Chinese Application No. 202080025049.6; Dated Nov. 25, 2023 (14 pages).
Office Action issued in U.S. Appl. No. 17/036,869; Dated Dec. 18, 2023 (34 pages).
Office Action issued in related U.S. Appl. No. 17/036,869 dated Jan. 25, 2023 (79 pages).
Mitsubishi Chemical Corporation, "jER TM Epoxy resins", Apr. 2021 (11 pages).
Extended European Search Report issued in corresponding European Patent Application No. 20867849.0, dated Sep. 8, 2023 (8 pages).
Office Action issued in corresponding Japanese Patent Application No. 2021-509698, mailed Sep. 19, 2023, with translation (9 pages).
Office Action issued in corresponding Japanese Patent Application No. 2021-509700, mailed Sep. 19, 2023, with translation (7 pages).
Office Action issued in U.S. Appl. No. 17/036,869, dated May 24, 2024 (41 pages).
Advisory Action issued in U.S. Appl. No. 17/036,869; Dated Aug. 15, 2024 (6 pages).
Hexion, "EPON and EPI-REZ Epoxy Resins"; Product Selector, pp. 1-16, Feb. 2014 (16 pages).
Office Action issued in corresponding U.S. Appl. No. 17/485,782, dated Jun. 10, 2024 (62 pages).
English translation of the International Preliminary Report on Patentability issued in corresponding International Application No. PCT/JP2019/051073, dated Jun. 16, 2021 (7 pages).
English translation of the International Search Report issued in corresponding International Application No. PCT/JP2019/051073, mailed Mar. 10, 2020 (2 pages).

Office Action issued in counterpart China Patent Application No. CN 201980085731.1 issued Feb. 21, 2023 (17 pages).
Office Action issued in corresponding Japanese Patent Application No. 2020-562394 dated Jul. 4, 2023 (4 pages).
Written Opinion issued in corresponding International Application No. PCT/JP2022/030280, dated Oct. 25, 2022 (11 pages).
International Search Report issued in corresponding International Application No. PCT/JP2022/030280, dated Oct. 25, 2022 (4 pages).
Office Action issued in related U.S. Appl. No. 17/486,036, dated Dec. 3, 2024 (51 pages).
Office Action issued in related U.S. Appl. No. 17/355,787; dated Sep. 25, 2024 (36 pages).
Dow GMA Product Datasheet (Year: 2024) (2 pages).
Epikote 828 Technical Data Sheet (Year: 2007) (2 pages).
Signma Aldrich Thermal Transitions of Homopolymers: Glass Transition & Melting Point, 2024 (7 pages).
Office Action issued in related U.S. Appl. No. 17/485,782; dated Nov. 26, 2024 (16 pages).
Office Action issued in related U.S. Appl. No. 17/486,036, dated May 2, 2025 (19 pages).
Office Action issued in related U.S. Appl. No. 17/486,166, dated May 8, 2025 (87 pages).
Office Action issued in related U.S. Appl. No. 17/486,036, dated Sep. 5, 2024 (8 pages).
Advisory Action issued in related U.S. Appl. No. 17/486,036, dated Jul. 16, 2025 (5 pages).
ELEC-F Safety Data Sheet, Kao Corporation, Nov. 5, 2020 (9 pages).
Office Action issued in related U.S. Appl. No. 17/698,248, dated Jul. 1, 2025 (98 pages).
Office Action issued in corresponding Japanese Patent Application No. 2021-509698, dated Nov. 25, 2025, with translation (11 pages).
Office Action issued in related U.S. Appl. No. 17/486,036, dated Oct. 22, 2025 (8 pages).
Advisory Action issued in related U.S. Appl. No. 17/486,166, dated Jan. 27, 2026 (3 pages).
Office Action issued in related U.S. Appl. No. 17/698,248, dated Jan. 14, 2026 (24 pages).

* cited by examiner

METHOD FOR PRODUCING RESIN COMPOSITION, AND RESIN COMPOSITION

TECHNICAL FIELD

One or more embodiments of the present invention relate to (i) a method of producing a resin composition and (ii) a resin composition.

BACKGROUND

Thermosetting resins have various kinds of excellent properties such as high heat resistance and high mechanical strength, and therefore are used in various fields. Out of the thermosetting resins, epoxy resins are used in a wide variety of applications, as matrix resins for, for example, sealants for electronic circuits, paints, adhesive agents, and fiber-reinforced materials. The epoxy resins have excellent heat resistance, chemical resistance, insulating properties, and the like, but are insufficient in impact resistance which is a characteristic of thermosetting resins. One widely used method to improve the impact resistance of a thermosetting resin is to add an elastomer to the thermosetting resin.

Examples of the elastomer encompass fine polymer particles (for example, fine crosslinked polymer particles). It is easy to simply mix the fine polymer particles and the thermosetting resin (for example, epoxy resin). The fine polymer particles and the thermosetting resin are mixed, for example, in the following manner. Several fine polymer particles each of which has a particle size of less than 1 μm are collected to prepare a powdery and/or granular material of the fine polymer particles which has a particle size of not less than 1 μm. Thereafter, the powdery and/or granular material and the thermosetting resin are mechanically mixed. Note that a powdery and/or granular material of fine polymer particles, which is prepared by collecting several fine polymer particles in this manner, is also referred to as secondary particles. Note also that fine polymer particles themselves, which have not been processed into a powdery and/or granular material and each of which has a particle size of less than 1 μm, are also referred to as primary particles. By the above mixing method, it is possible to disperse secondary particles of the fine polymer particles in the thermosetting resin. However, it is extremely difficult, at an industrial level, to disperse, in the thermosetting resin, primary particles of the fine polymer particles, each of which has a particle size of less than 1 μm.

As a measure taken in regard to the dispersibility, Patent Literature 1, for example, reports a method of producing an epoxy resin composition in which fine particles of a crosslinked core-shell particulate copolymer are directly dispersed uniformly in an epoxy resin, by mixing the epoxy resin into a latex and devolatilizing a resulting mixture (Examples etc.). Further, Patent Literature 2 discloses a technique of obtaining an epoxy resin composition in which rubbery polymer particles are well dispersed in an epoxy resin and which contains few contaminants. Specifically, Patent Literature 2 discloses (a) substantially separating water from an aqueous latex of rubbery polymer particles by (i) bringing an organic medium which exhibits partial solubility in water into contact with the aqueous latex and then (ii) further bringing an organic medium which exhibits less partial solubility in water than the above organic medium into contact therewith, (b) taking out a resulting dispersion in which the rubbery polymer particles are dispersed in these organic media, (c) mixing the dispersion with an epoxy resin, and then (d) distilling off a volatile component.

PATENT LITERATURE

[Patent Literature 1]
Japanese Patent Application Publication, Tokukaihei, No. 8-183836 (1996)
[Patent Literature 2]
PCT International Publication No. WO 2004/108825
However, the foregoing technique reported in Patent Literature 1 was found that an emulsifying agent and the like used during formation of a crosslinked core-shell particulate copolymer by polymerization all remain in an epoxy resin. Further, the technique disclosed in Patent Literature 2 was found that although impurities derived from formation of rubbery polymer particles by polymerization are removed, organic media (solvents) remain in a resin.

SUMMARY

One or more embodiments of the present invention provide a novel resin composition which imposes a reduced environmental load and which contains few impurities.

As a result of conducting diligent studies, the inventors of one or more embodiments of the present invention newly found it possible to efficiently wash away water-soluble impurities by washing, with water, an agglutinate which contains, at a given weight ratio, fine polymer particles and a resin having a specific viscosity. As a result, the inventors of the one or more embodiments of present invention completed one or more embodiments of the present invention.

Specifically, one or more embodiments of the present invention include the following.

A method of producing a resin composition, including: a washing step of washing a resin composition with water, the resin composition containing: fine polymer particles (A) which have a graft part that is constituted by a polymer containing, as one or more structural units, one or more structural units derived from at least one type of monomer selected from the group consisting of aromatic vinyl monomers, vinyl cyanide monomers, and (meth)acrylate monomers; and a resin (B) which is, at 25° C., a liquid having a viscosity of 100 mPa·s to 1,000,000 mPa·s, a semisolid, or a solid, in a case where a total amount of the fine polymer particles (A) and the resin (B) is regarded as 100% by weight, an amount of the fine polymer particles (A) being 1% by weight to 70% by weight and an amount of the resin (B) being 30% by weight to 99% by weight.

A resin composition containing: fine polymer particles (A) which have a graft part that is constituted by a polymer containing, as one or more structural units, one or more structural units derived from at least one type of monomer selected from the group consisting of aromatic vinyl monomers, vinyl cyanide monomers, and (meth)acrylate monomers; and a resin (B) which is, at 25° C., a liquid having a viscosity of 100 mPa·s to 1,000,000 mPa·s, a semisolid, or a solid, in a case where a total amount of the fine polymer particles (A) and the resin (B) is regarded as 100% by weight, an amount of the fine polymer particles (A) being 30% by weight to 70% by weight and an amount of the resin (B) being 30% by weight to 70% by weight.

According to one or more embodiments of the present invention, it is possible to provide a resin composition which imposes a reduced environmental load and which contains few impurities.

DETAILED DESCRIPTION

The following description will discuss one or more embodiments of the present invention. One or more embodiments of the present invention are not, however, limited to these embodiments. One or more embodiments of the present invention are not limited to the configurations described below, but may be altered in various ways within the scope of the claims. One or more embodiments of the present invention also encompass, in their technical scopes, any embodiments or examples derived by combining technical means disclosed in differing embodiments and Examples. Further, it is possible to form a new technical feature by combining the technical means disclosed in various embodiments. All academic and patent documents cited in the present specification are incorporated herein by reference. Any numerical range expressed as "A to B" in the present specification means "not less than A and not more than B (i.e., a range from A to B which includes both A and B)" unless otherwise stated.

[1. Method of Producing Resin Composition]

A method of producing a resin composition in accordance with one or more embodiments of the present invention is a method of producing a resin composition, including: a washing step of washing a resin composition with water, the resin composition containing: fine polymer particles (A) which have a graft part that is constituted by a polymer containing, as one or more structural units, one or more structural units derived from at least one type of monomer selected from the group consisting of aromatic vinyl monomers, vinyl cyanide monomers, and (meth)acrylate monomers; and a resin (B) which has a viscosity of not more than 1,000,000 mPa·s at 25° C., in a case where a total amount of the fine polymer particles (A) and the resin (B) is regarded as 100% by weight, an amount of the fine polymer particles (A) being 1% by weight to 70% by weight and an amount of the resin (B) being 30% by weight to 99% by weight. Hereinafter, the method of producing a resin composition in accordance with one or more embodiments of the present invention may be simply referred to as a present production method.

The inventors of one or more embodiments of the present invention found that a technique as disclosed in Patent Literature 1 has low efficiency of washing the inside of fine polymer particles and, therefore, an epoxy resin contains impurities in large amounts. As a result of conducting diligent studies, the inventors of one or more embodiments of the present invention found that, by washing a resin composition which is an agglutinate that contains, at a specific weight ratio, fine polymer particles (A) and a resin (B) which has a specific viscosity, it is possible to efficiently reduce impurities contained in the resin composition. In particular, the inventors of one or more embodiments of the present invention found that an excellent washing effect is brought about in a case where the resin composition which contains the fine polymer particles (A) and the resin (B) is in, not powdery and/or granular form, but liquid form, dough form (viscous rubbery substance), or crumb form (also referred to as kompeito (ball-like candy covered with tiny bulges) form).

In regard to the weight ratio between the fine polymer particles (A) and the resin (B) in the resin composition and the form of the resin composition, the inventors of one or more embodiments of the present invention found out the following relationship: in a case where the total amount of the fine polymer particles (A) and the resin (B) is regarded as 100% by weight, (i) the resin composition tends to be in liquid form when the amount of the fine polymer particles (A) is more than 0% by weight and less than 30% by weight, (ii) the resin composition tends to be in dough form when the amount of the fine polymer particles (A) is not less than 30% by weight and less than 50% by weight, (iii) the resin composition tends to be in crumb form when the amount of the fine polymer particles (A) is not less than 50% by weight and not more than 70% by weight, and (iv) the resin composition tends to be in powdery and/or granular form when the amount of the fine polymer particles (A) is more than 70% by weight.

The forms which the resin composition takes are principally defined as above, but are also defined as follows. After the resin composition is crushed with use of a mill, (v) in a case where the amount of the fine polymer particles (A) is more than 0% by weight and less than 50% by weight and in a case where not less than 20% of the resin composition passes through an 8-mesh metal gauze when the resin composition is placed on the metal gauze at 25° C. for 10 minutes, the resin composition is in liquid form; (vi) in a case where the amount of the fine polymer particles (A) is more than 0% by weight and less than 50% by weight and in a case where not less than 20% of the resin composition does not pass through an 8-mesh metal gauze when the resin composition is placed on the metal gauze at 25° C. for 10 minutes, the resin composition is in dough form; (vii) in a case where the amount of the fine polymer particles (A) is more than 50% by weight and less than 100% by weight and in a case where not less than 20% of the resin composition does not pass through an 8-mesh metal gauze when the resin composition is placed on the metal gauze at 25° C. for 10 minutes, the resin composition is in crumb form; and (viii) in a case where the amount of the fine polymer particles (A) is more than 50% by weight and less than 100% by weight and in a case where not less than 20% of the resin composition passes through an 8-mesh metal gauze when the resin composition is placed on the metal gauze at 25° C. for 10 minutes, the resin composition is in powdery and/or granular form. Note that the total amount of the fine polymer particles (A) and the resin (B) is regarded as 100% by weight.

Further, by mixing the fine polymer particles (A) and the resin (B) which has a specific viscosity, the resin composition in which the fine polymer particles (A) are uniformly dispersed in the resin (B) is obtained. In a case where (i) in the resin composition, the fine polymer particles (A) are uniformly dispersed in the resin (B) and (ii) the resin composition is in liquid form, dough form, or crumb form, it is possible to efficiently reduce impurities by washing the resin composition. Furthermore, since washing efficiency is high, it is also possible to reduce rinse water and reduce the size of a production device. Moreover, productivity is improved, and a liquid waste is reduced. Therefore, an environmental load is reduced. Note that the reason why the washing efficiency is low in a case where the resin composition is in powdery and/or granular form is inferred as follows. That is, the reason is that, although impurities on a surface of a powdery and/or granular material which is the agglutinate can be removed, impurities inside the powdery and/or granular material cannot be removed. The present production method is intended for the resin composition which is in form other than powdery and/or granular form, that is, the resin composition which is in liquid form, dough form, or crumb form.

In the present specification, the term "powdery and/or granular material" refers to a material which can be a powder and/or a granule(s) and which is made up of a powder particle(s), a grain(s), and/or the like. In a case where a specific distinction is made between "powder" and "granules", the "powder" has a volume-average particle size of 0.01 mm to 0.1 mm, whereas the "granules" have a volume-average particle size of 0.1 mm to 10 mm. Note, however, that the powdery and/or granular material may include a coarse particle(s) having a volume-average particle size of not less than 10 mm. The "volume-average particle size" less than 10 μm can be measured with use of a dynamic light scattering (DLS) particle size distribution analyzer Nanotrac WaveII-EX150 (manufactured by MicrotracBEL Corp.), and the "volume-average particle size" equal to or more than 10 μm can be measured with use of a laser diffraction particle size distribution analyzer Microtrac MT3000II (manufactured by MicrotracBEL Corp.).

According to the present production method, it is possible to obtain the agglutinate which contains few contaminants. Furthermore, since an organic solvent is not used, an environmental load is reduced, and also human bodies are less adversely affected. Moreover, the resin composition (cured product) contains few impurities (water-soluble compounds) which are derived from an emulsifying agent, a flocculant (mineral salt), and/or metallic soap, and, therefore, the resin composition (cured product) has improved qualities (such as coloring and storage stability). In addition, the resin composition (cured product) is suitable for use in electronic materials and the like.

The following description will discuss each step of the present production method in detail, and then discuss the fine polymer particles (A), the resin (B), etc.

(1-1. Washing Step)

The present production method only needs to include a washing step of washing the resin composition with water. By washing the resin composition which is the agglutinate, the resin composition which contains few contaminants and the like is obtained. The washing step may be carried out by washing the resin composition with ion exchanged water or pure water.

A specific method of carrying out the washing step is not limited to any particular one, provided that the washing step is a step of washing the resin composition with water. Examples thereof encompass: a method in which the resin composition and water are mixed and then stirred by applying shearing with use of a stirrer, a homomixer, a high shear emulsifier, or the like; a method in which the resin composition and water are kneaded with use of a kneader; and a method in which the resin composition and water are mixed with use of a planetary centrifugal mixer. Examples of the kneader encompass various types of kneaders such as batch type kneaders, continuous type kneaders, and extruders.

The washing step can be carried out in various modes, which are not limited to any particular ones. Examples of the modes encompass: (i) a mode in which the washing step is carried out in a batch manner by providing an emulsifier or the like to a container in which the resin composition has been introduced; (ii) a mode in which a step of causing the resin composition to pass through an emulsifier or the like is carried out a plurality of times, (iii) a mode in which the resin composition is continuously washed by providing an emulsifier or the like to a flow path through which the resin composition passes; (iv) a mode in which, in the mode (iii), the resin composition is caused to pass through an emulsifier or the like a plurality of times; and (v) a mode in which the resin composition which has been caused to pass through an emulsifier or the like in the mode (iii) or (iv) is separated into the agglutinate and water and then an operation in the mode (iii) or (iv) is carried out so that the resin composition is washed a plurality of times.

A period of time for which the resin composition is washed is not limited to any particular one, and can be, for example, 1 second to 60 minutes. The period of time for which the resin composition is washed may be 1 second to 45 minutes, or 1 second to 30 minutes.

The number of times the resin composition is washed is not limited to any particular one, and can be, for example, 1 to 10. The number of times the resin composition is washed may be 1 to 6, and or 1 to 4.

The amount of the rinse water is not limited to any particular one, and can be, for example, 0.5 parts by weight to 1000 parts by weight with respect to 1 part by weight of the resin composition. The amount of the rinse water may be 1 part by weight to 500 parts by weight, or 5 parts by weight to 200 parts by weight. Washing the resin composition by kneading the resin composition with use of a kneader is more preferable, because it is possible to reduce the amount of the rinse water.

The temperature of the rinse water is also not limited. For example, water at an ordinary temperature or heated warm water may be used as appropriate. The temperature of the warm water can be, for example, 10° C. to 100° C., but may be 15° C. to 90° C., 20° C. to 85° C., or 25° C. to 60° C. Since the warm water brings about a higher washing effect, heated rinse water may be used. Note that in a case where the resin composition is deteriorated by heat, the resin composition may be washed at a lower temperature and may be washed for a shorter period of time.

In particular, the temperature of the water used in the washing step may be not higher than 60° C. In a case where the temperature at which the resin composition is washed is not higher than 60° C., the resin composition has a viscosity which allows impurities to be most easily washed away. This allows an improvement in washing efficiency. Generally, as the viscosity of an object to be washed becomes lower, washing efficiency becomes higher. In other words, generally, at high temperatures at which the viscosity of an object to be washed becomes low, washing efficiency is improved. However, as a result of conducting diligent studies, the inventors of one or more embodiments of the present invention surprisingly found that, according to the washing step of the present production method, in a case where the temperature during washing is equal to or lower than a given temperature, the viscosity becomes higher than that at high temperatures and the washing efficiency is improved.

It is inferred that in a case where the temperature during the washing is equal to or lower than the given temperature, an object being washed falls within a so-called viscous range and impurities can be efficiently washed away. Washing an object falling within a viscous range can be referred to as a step of washing an object in a state where the object has a loss tangent tan (δ) In of not less than 1. The mechanism of efficient washing of an object falling within a viscous range can be inferred as follows. The resin composition containing the fine polymer particles (A) and the resin (B) in the present production method tends to have a lower viscosity and a lower tan δ as the temperature raises. Thus, the inventors of one or more embodiments of the present invention inferred that in a case where the resin composition falls within a viscosity-dominant range in which the resin composition has a loss tangent tan δ of not less than 1, the distributive mixing property of the fine polymer particles (A) in the resin composition is improved, while in a case where the resin composition falls within an elasticity-dominant range in which the resin composition has a loss tangent tan δ of not more than 1, the dispersive mixing property of the fine polymer particles (A) is deteriorated. That is, in a case where elasticity dominates, the fine polymer particles (A) in the resin composition form a cluster, and the resin (B) taken inside the cluster does not appear on the surface of the resin composition, so that the washing efficiency is decreased. In particular, it can be inferred that in a case where the concentration of the fine polymer particles (A) is low, the fine polymer particles (A) form a large cluster and the washing efficiency is more decreased. For this reason, it is inferred that, by washing the resin composition at a temperature which is equal to or lower than a given value, i.e., in a state where the resin composition falls within the viscosity-dominant range in which the resin composition has a high viscosity, impurities present between the fine polymer particles (A) can be removed efficiently.

The viscosity of the resin composition tends to become higher, as the concentration of the fine polymer particles (A) in the resin composition becomes higher. According to the washing step of the present production method, there is an aspect that as the concentration of the fine polymer particles (A) becomes higher, that is, the viscosity of the resin composition becomes higher, the washing efficiency is improved. As has been described, it is generally understood that in a case where an object being washed has a lower viscosity, it is easier to wash the object. Therefore, the washing step of the present production method has specificity.

A method of removing the rinse water used in the washing step is also not limited to any particular one. Examples thereof encompass wiping away the rinse water, filtration under reduced pressure, oil-water separation, and press dehydration.

An object to be washed away is intended to mean impurities contained in the resin composition in general, and is not limited to any particular one. Examples thereof encompass: contaminants derived from an emulsifying agent (e.g., phosphorus-based emulsifying agent, sulfonic acid-based emulsifying agent); and, in a case where a flocculant (described later) is used, contaminants derived from the flocculant.

Examples of the emulsifying agent encompass (a) anionic emulsifying agents, e.g., acids such as those listed below, alkali metal salts of such acids, and ammonium salts of such acids, (b) nonionic emulsifying agents, e.g., alkyl- or aryl-substituted polyethylene glycols, and (c) polyvinyl alcohols, alkyl-substituted celluloses, polyvinylpyrrolidone, and poly-acrylic acid derivatives. Examples of the acids encompass (a1) alkyl or aryl sulfonic acids (such as dioctyl sulfosuccinic acid and dodecylbenzenesulfonic acid) and alkyl or aryl ether sulfonic acids, (a2) alkyl sulfates (such as dodecyl sulfate), aryl sulfates, and alkyl or aryl ether sulfates, (a3) alkyl- or aryl-substituted phosphoric acids and alkyl or aryl ether-substituted phosphoric acids, (a4) N-alkyl sarcosine acids (such as dodecyl sarcosine acid) and N-aryl sarcosine acids, and (a5) alkyl carboxylic acids (such as oleic acid and stearic acid), aryl carboxylic acids, and alkyl or aryl ether carboxylic acids. Note, here, that an anionic emulsifying agent formed from any of the acids listed in the (a1) and (a2) is referred to as a "sulfur-based emulsifying agent", an anionic emulsifying agent formed from any of the acids listed in the (a3) is referred to as a "phosphorus-based emulsifying agent", an anionic emulsifying agent formed from any of the acids listed in the (a4) is referred to as a "sarcosine acid-based emulsifying agent", and an anionic emulsifying agent formed from any of the acids listed in the (a5) is referred to as a "carboxylic acid-based emulsifying agent". These emulsifying agents may be used alone or in combination of two or more.

(1-2. Agglutinating Step)

The present production method may further include an agglutinating step of obtaining, from a latex, the resin composition as the agglutinate which contains the fine polymer particles (A) and the resin (B), by at least one type of method selected from the group consisting of flocculation with use of a flocculant, shearing, and freezing. The agglutinating step only needs to be a step which allows the resin composition to be collected as the agglutinate from the latex, and can be carried out by flocculation with use of a flocculant, shearing, or freezing alone or can be alternatively carried out by a combination of any of them. The agglutinating step may be carried out before the washing step.

(Flocculant)

The flocculant which can be used is not limited to any particular one, provided that the flocculant is a polymer agglutinant and/or an aqueous solution of an inorganic acid (salt) and/or an organic acid (salt) that has the property of allowing an emulsion polymerization latex to coagulate or flocculate. Examples of the aqueous solution encompass: aqueous solution of one or more mineral salts such as sodium chloride, potassium chloride, lithium chloride, sodium bromide, potassium bromide, lithium bromide, potassium iodide, sodium iodide, potassium sulfate, sodium sulfate, ammonium sulfate, ammonium chloride, sodium nitrate, potassium nitrate, calcium chloride, ferrous sulfate, magnesium sulfate, zinc sulfate, copper sulfate, barium chloride, ferrous chloride, ferric chloride, magnesium chloride, ferric sulfate, aluminum sulfate, potassium alum, and/or iron alum; aqueous solution of one or more inorganic acids such as hydrochloric acid, sulfuric acid, nitric acid, and/or phosphoric acid; organic acids such as acetic acid and formic acid and aqueous solution of one or more of them; and aqueous solution of one or more organic acid salts such as sodium acetate, calcium acetate, sodium formate, and/or calcium formate. The polymer agglutinant is not limited to any particular one, provided that the polymer agglutinant is a polymer compound containing a hydrophilic group and a hydrophobic group, and may be any one or more of the following: an anionic polymer agglutinant, a cationic polymer agglutinant, and a nonionic polymer agglutinant. The polymer agglutinant may be a cationic polymer agglutinant, because this makes it possible to further improve an effect of one or more embodiments of the present invention. The cationic polymer agglutinant may be a polymer agglutinant that contains a cationic group within its molecule, that is, a polymer agglutinant that shows a cationic property when dissolved in water. Examples of such a polymer agglutinant encompass polyamines, polydicyandiamides, cationized starch, cationic poly(meth)acrylamide, water-soluble aniline resin, polythiourea, polyethyleneimine, quaternary ammonium salts, polyvinylpyridines, and chitosan. One of such compounds may be used alone or in combination of two or more. Out of the above flocculants, suitably used is an aqueous solution of one or more mono- or di-valent mineral salts or mono- or di-valent inorganic acids such as sodium chloride, potassium chloride, sodium sulfate, ammonium chloride, calcium chloride, magnesium chloride, magnesium sulfate, barium chloride, hydrochloric acid, and/or sulfuric acid.

A method of adding the flocculant is not limited to any particular one. The flocculant may be added at a time, added batchwise, or added continuously. The flocculant may be added to the latex which contains the fine polymer particles (A), and then the resin (B) may be mixed into the latex. Alternatively, the flocculant may be added to the resin (B), and then the resin (B) and the latex which contains the fine polymer particles (A) may be mixed. Alternatively, the flocculant may be added to the latex which contains the fine polymer particles (A) and the resin (B).

The amount of the flocculant to be added can be 1 part by weight to 50 parts by weight with respect to 100 parts by weight of the resin composition. The amount of the flocculant may be 2 parts by weight to 30 parts by weight, or 3 parts by weight to 20 parts by weight. Note that the amount of the flocculant to be added can be varied, as appropriate, depending on the type of the latex.

The concentration of the fine polymer particles (A) contained in the latex may be 20% to 70%, 25% to 65%, 30% to 60%, or 35% to 55%. This range allows an improvement in efficiency of obtaining the agglutinate.

In a case where the resin (B) to which the flocculant has been added in advance is mixed into the latex which contains the fine polymer particles (A) or in a case where the flocculant is added to the latex which contains the fine polymer particles (A) and the resin (B), there is no need to carry out a granulating step. This leads to simplification of a process.

(Shearing)

Shearing is a method of, by shearing, suppressing emulsification and collecting, from the latex, the resin composition which is the agglutinate. For example, the method can include: a step of mixing the resin (B) into the latex which contains the fine polymer particles (A); a shearing step of applying shearing stress to the latex which has been obtained in the preceding step; and after the shearing step, a step of separating the latex into the resin composition and a water component, the resin composition being the agglutinate which contains the fine polymer particles (A) and the resin (B).

A method of applying shearing stress to the latex is not limited to any particular one, and shearing stress can be applied to the latex with use of, for example, a homomixer, a high shear emulsifier, and/or the like.

Modes of this step include a mode in which, at a stage prior to the step of mixing the fine polymer particles (A) and the resin (B), shearing stress is applied, in advance, to the latex which contains the fine polymer particles (A) and which has not been mixed with the resin (B). Moreover, the modes of this step also include a mode in which shearing stress is applied to the resin (B) in advance. The modes of the step may further include a mode in which shearing stress is applied to both (i) the latex which contains the fine polymer particles (A) and (ii) the resin (B) in advance before the step of mixing the fine polymer particles (A) and the resin (B). These methods are preferable in that the emulsifying ability of the latex is reduced and accordingly the agglutinate is efficiently obtained.

(Freezing)

An example of a method of obtaining the agglutinate by freezing can be a method including: a step of rapidly freezing the latex which contains the fine polymer particles (A); a step of thawing the latex which has been frozen in the preceding step; a step of mixing the resin (B) into the latex which has been subjected to the preceding step; and after the thawing step and the resin mixing step, a separating step of separating the latex into the resin composition and the water component, the resin composition being the agglutinate which contains the fine polymer particles (A) and the resin (B).

The rapid freezing step is a step of rapidly freezing the latex which contains the fine polymer particles (A). In the present specification, the wording "rapidly freezing" means freezing the latex in 1 second to less than 20 minutes. It is preferable that the latex be frozen in 10 seconds to 10 minutes. A specific method of rapidly freezing the latex is not limited to any particular one, and various techniques relating to instantaneous freezing and rapid freezing can be employed. Examples thereof may encompass: a method in which the latex is brought into contact with a metal surface cooled to −80° C. to −10° C.; a method in which the latex is instantaneously cooled and flocculated by spraying the latex into cold air with use of a spray cooler; a method in which the latex is put into liquid nitrogen; and a method in which the latex is brought into contact with dry ice.

The step of mixing the resin (B) into the latex which contains the fine polymer particles (A) may be carried out either before or after the thawing step. For example, in a case where the step of mixing the resin (B) into the latex which contains the fine polymer particles (A) is carried out before the thawing step, the step can be carried out as follows: the resin (B) is added to the latex which has been frozen, the latex is subsequently thawed, and then the latex and the resin (B) are mixed. Alternatively, in a case where the step of mixing the resin (B) into the latex which contains the fine polymer particles (A) is carried out after the thawing step, it is only necessary to (i) add the resin (B) to the latex which has been thawed and (ii) mix them.

Another example of a method of obtaining the agglutinate by freezing can be a method including: a step of mixing the resin (B) into the latex which contains the fine polymer particles (A); a freezing step of freezing the latex which has been obtained in the preceding step and in which the resin (B) is dispersed; a step of thawing the latex which has been frozen in the preceding step; and after the preceding steps, a separating step of separating the latex into the resin composition and the water component, the resin composition being the agglutinate which contains the fine polymer particles (A) and the resin (B).

Note, here, that the wording "freezing" in the another example includes a step of rapidly freezing the latex and a step of slowly freezing the latex. A method of rapidly freezing the latex is similar to the above-described method. Note also that the wording "slowly freezing" means freezing the latex in 20 minutes to 24 hours. It is preferable that the latex be frozen in 30 minutes to 12 hours. An example of a method of slowly freezing the latex can be a method in which the latex is put in a freezer as it is. An example of a method of rapidly freezing the latex can be a method in which, when the latex is put in a freezer, the latex is left to stand still on a metal surface.

(1-3. Intermediate Washing Step)

According to the present production method, the agglutinating step may include: a first agglutinating step of obtaining, from the latex which contains the fine polymer particles (A), the agglutinate which contains the fine polymer particles (A); an intermediate washing step of washing, with water, the agglutinate which has been obtained in the first agglutinating step; and a second agglutinating step of obtaining the agglutinate which contains the fine polymer particles (A) and the resin (B), by mixing the resin (B) and the agglutinate which has been subjected to the intermediate washing step.

This method is a method of first obtaining the agglutinate which contains the fine polymer particles (A), subsequently washing the agglutinate once, and then mixing the resin (B) and the latex so as to ultimately collect the resin composition which is the agglutinate that contains the fine polymer particles (A) and the resin (B). By subsequently carrying out the washing step, it is possible to wash the resin composition at a plurality of stages. This allows obtainment of the resin composition which contains fewer impurities.

A method of obtaining the agglutinate in the first agglutinating step and the second agglutinating step can be the above-described flocculation with use of a flocculant, shearing, or freezing.

Further, a method similar to the above-described washing step can be employed for the intermediate washing step. Note, here, that the intermediate washing step may include a step of washing the agglutinate which has been obtained in the first agglutinating step, with water having a temperature lower than a glass transition temperature (Tg) of the fine polymer particles (A). Note that the Tg of the fine polymer particles (A) can be calculated from the Tg of the graft part (described later). Note also that the intermediate washing step may include a step of washing the agglutinate which has been obtained in the first agglutinating step, with water at not higher than 40° C., or the water at not higher than 30° C. This is because by washing, in this temperature range, the agglutinate which contains the fine polymer particles (A) and which has been obtained in the first agglutinating step, it is possible to obtain the agglutinate in which the fine polymer particles (A) loosely agglutinate, and there is an advantage that in a case where such a loose agglutinate is mixed with the resin (B), the fine polymer particles (A) are uniformly dispersed in the resin (B).

(1-4. Fine Polymer Particles (A))

The fine polymer particles (A) are not limited to any particular ones, provided that the fine polymer particles (A) are fine particles obtained by polymerization. For example, the fine polymer particles (A) may be fine polymer particles having at least a graft part which is constituted by a polymer containing, as one or more structural units, one or more structural units derived from at least one type of monomer selected from the group consisting of aromatic vinyl monomers, vinyl cyanide monomers, and (meth)acrylate monomers. It can be said that the fine polymer particles (A) are constituted by a graft copolymer.

(Graft Part)

In the present specification, a polymer grafted to any polymer is referred to as a graft part. The graft part is a polymer containing, as one or more structural units, one or more structural units derived from at least one type of monomer selected from the group consisting of aromatic vinyl monomers, vinyl cyanide monomers, and (meth)acrylate monomers. The graft part has the above feature, and therefore can play various roles. The "various roles" are, for example, (a) improving compatibility between the fine polymer particles (A) and a thermosetting resin, (b) improving the dispersibility of the fine polymer particles (A) in a thermosetting resin which is a matrix resin with which the resin composition that is the agglutinate containing the fine polymer particles (A) and the resin (B) is mixed, and (c) allowing the fine polymer particles (A) to be dispersed in the form of primary particles in a/the resin composition or in a cured product obtained from the resin composition.

Specific examples of the aromatic vinyl monomers encompass styrene, α-methylstyrene, p-methylstyrene, and divinylbenzene.

Specific examples of the vinyl cyanide monomers encompass acrylonitrile and methacrylonitrile.

Specific examples of the (meth)acrylate monomers encompass methyl (meth)acrylate, ethyl (meth)acrylate, butyl (meth)acrylate, hydroxyethyl (meth)acrylate, and hydroxybutyl (meth)acrylate. In the present specification, (meth)acrylate means acrylate and/or methacrylate.

The at least one type of monomer selected from the group consisting of the aromatic vinyl monomers, the vinyl cyanide monomers, and the (meth)acrylate monomers may be used alone or in combination of two or more.

The graft part may contain, as a structural unit, a structural unit derived from a reactive group-containing monomer. The reactive group-containing monomer may be a monomer containing at least one type of reactive group selected from the group consisting of an epoxy group, an oxetane group, a hydroxyl group, an amino group, an imide group, a carboxylic acid group, a carboxylic anhydride group, cyclic ester, cyclic amide, a benzoxazine group, and a cyanate ester group, or may be a monomer containing at least one type of reactive group selected from the group consisting of an epoxy group, a hydroxy group, and a carboxylic acid group. According to the above feature, it is possible to chemically bond, in the resin composition, (i) the graft part contained in the fine polymer particles (A) and (ii) a thermosetting resin. Thus, in the resin composition or in the cured product obtained from the resin composition, it is possible to maintain a favorable state of dispersion of the fine polymer particles (A) without causing the fine polymer particles (A) to agglutinate.

Specific examples of a monomer having an epoxy group encompass glycidyl (meth)acrylate, 4-hydroxybutyl (meth) acrylate glycidyl ether, and allyl glycidyl ether.

Specific examples of a monomer having a hydroxyl group encompass: hydroxy straight-chain alkyl (meth)acrylates (in particular, hydroxy straight-chain C1-C6 alkyl(meth)acrylates) such as 2-hydroxyethyl (meth)acrylate, hydroxypropyl (meth)acrylate, and 4-hydroxybutyl (meth)acrylate; caprolactone-modified hydroxy (meth)acrylate; hydroxy branching alkyl (meth)acrylates such as α-(hydroxymethyl) methyl acrylate and α-(hydroxymethyl) ethyl acrylate; and hydroxyl group-containing (meth)acrylates such as a mono (meth)acrylate of a polyester diol (particularly saturated polyester diol) obtained from dicarboxylic acid (e.g. phthalic acid) and dihydric alcohol (e.g. propylene glycol).

Specific examples of a monomer having a carboxylic acid group encompass monocarboxylic acids such as acrylic acid, methacrylic acid, and crotonic acid. Other examples of the monomer encompass dicarboxylic acids such as maleic acid, fumaric acid, and itaconic acid. As the monomer having a carboxylic acid group, the monocarboxylic acid is suitably used.

The above-listed reactive group-containing monomers may be used alone or in combination of two or more.

The graft part may contain the structural unit derived from the reactive group-containing monomer in an amount of 0.5% by weight to 90% by weight, 1% by weight to 50% by weight, 2% by weight to 35% by weight, or 3% by weight to 20% by weight, with respect to 100% by weight of the graft part. In a case where the graft part contains the structural unit derived from the reactive group-containing monomer in an amount of not less than 0.5% by weight with respect to 100% by weight of the graft part, the resulting resin composition has an advantage that the resin composition can provide the cured product which has enough impact resistance. In a case where the graft part contains the structural unit derived from the reactive group-containing monomer in an amount of not more than 90% by weight with respect to 100% by weight of the graft part, the resulting resin composition has advantages that (i) the resin composition can provide the cured product which has sufficient impact resistance and (ii) the resin composition has favorable storage stability.

The structural unit derived from the reactive group-containing monomer may be contained in the graft part, or contained only in the graft part.

The graft part may contain, as a structural unit, a structural unit derived from a polyfunctional monomer. In a case where the graft part contains the structural unit derived from the polyfunctional monomer, there are the following advantages, for example: (a) it is possible to prevent swelling of the fine polymer particles (A) in the resin composition; (b) since the resin composition has a low viscosity, the resin composition tends to have favorable handleability; and (c) the dispersibility of the fine polymer particles (A) in a thermosetting resin is improved.

In a case where the graft part does not contain the structural unit derived from the polyfunctional monomer, the resulting resin composition can provide the cured product which has more excellent toughness and impact resistance, as compared to a case where the graft part contains the structural unit derived from the polyfunctional monomer.

It can also be said that the polyfunctional monomer is a monomer having two or more radical-polymerizable reactive groups in an identical molecule. The radical-polymerizable reactive groups may be each a carbon-carbon double bond. Examples of the polyfunctional monomer do not encompass butadiene. The polyfunctional monomer is, for example, a (meth)acrylate having an ethylenically unsaturated double bond(s), such as allyl (meth)acrylate. Examples of a monomer having two (meth)acrylic groups encompass ethylene glycol di(meth)acrylate, butanediol di(meth)acrylate, hexanediol di(meth)acrylate, cyclohexane dimethanol di(meth)acrylate, and polyethylene glycol di(meth)acrylates. Examples of the polyethylene glycol di(meth)acrylates encompass triethylene glycol di(meth)acrylate, tripropylene glycol di(meth)acrylate, tetraethylene glycol di(meth)acrylate, and polyethylene glycol (600) di(meth)acrylate. Examples of a monomer having three (meth)acrylate groups encompass alkoxylated trimethylolpropane tri(meth)acrylates, glycerol propoxy tri(meth)acrylate, pentaerythritol tri(meth)acrylate, and tris(2-hydroxyethyl)isocyanurate tri(meth)acrylate. Examples of the alkoxylated trimethylolpropane tri(meth)acrylates encompass trimethylolpropane tri(meth)acrylate and trimethylolpropane triethoxy tri(meth)acrylate. Examples of a monomer having four (meth)acrylic groups encompass pentaerythritol tetra(meth)acrylate and ditrimethylolpropane tetra(meth)acrylate. Examples of a monomer having five (meth)acrylic groups encompass dipentaerythritol penta(meth)acrylate. Examples of a monomer having six (meth)acrylic groups encompass ditrimethylolpropane hexa(meth)acrylate.

Out of such polyfunctional monomers, examples of a polyfunctional monomer which may be used to form the graft part by polymerization encompass allyl methacrylate, ethylene glycol di(meth)acrylate, butanediol di(meth)acrylate, hexanediol di(meth)acrylate, cyclohexane dimethanol di(meth)acrylate, and polyethylene glycol di(meth)acrylates. The above-listed polyfunctional monomers may be used alone or in combination of two or more.

The graft part may contain the structural unit derived from the polyfunctional monomer in an amount of 1% by weight to 20% by weight, or 5% by weight to 15% by weight, with respect to 100% by weight of the graft part.

The graft part may contain, as a structural unit, a structural unit derived from another monomer, in addition to the structural units derived from the above-listed monomers.

The graft part may be a polymer grafted to an elastic body (described later).

(Glass Transition Temperature of Graft Part)

The graft part may have a glass transition temperature of not higher than 190° C., not higher than 160° C., not higher than 140° C., not higher than 120° C., not higher than 80° C., not higher than 70° C., not higher than 60° C., not higher than 50° C., not higher than 40° C., not higher than 30° C., not higher than 20° C., not higher than 10° C., not higher than 0° C., not higher than −20° C., not higher than −40° C., not higher than −45° C., not higher than −50° C., not higher than −55° C., not higher than −60° C., not higher than −65° C., not higher than −70° C., not higher than −75° C., not higher than −80° C., not higher than −85° C., not higher than −90° C., not higher than −95° C., not higher than −100° C., not higher than −105° C., not higher than −110° C., not higher than −115° C., not higher than −120° C., or not higher than −125° C.

The glass transition temperature of the graft part may be not lower than 0° C., not lower than 30° C., not lower than 50° C., not lower than 70° C., not lower than 90° C., or not higher than 110° C.

The Tg of the graft part can be determined by, for example, the composition of the structural unit contained in the graft part. In other words, it is possible to adjust the Tg of the resulting graft part, by changing the composition of the monomer used to produce (form) the graft part.

The Tg of the graft part can be obtained by carrying out viscoelasticity measurement with use of a planar plate made of the fine polymer particles. Specifically, the Tg can be measured as follows: (1) a graph of tan δ is obtained by carrying out dynamic viscoelasticity measurement with respect to a planar plate made of the fine polymer particles, with use of a dynamic viscoelasticity measurement device (for example, DVA-200, manufactured by IT Keisoku Seigyo Kabushikigaisha) under a tension condition; and (2) in the graph of tan δ thus obtained, the peak temperature of tan δ is regarded as the glass transition temperature. Note, here, that in a case where a plurality of peaks are found in the graph of tan δ, the highest peak temperature is regarded as the glass transition temperature of the graft part.

(Graft Rate of Graft Part)

In one or more embodiments of the present invention, the fine polymer particles (A) may have a polymer which is identical in composition to the graft part and which is not grafted to the elastic body (described later). In the present specification, the polymer which is identical in composition to the graft part and which is not grafted to the elastic body (described later) may be referred to as a "non-grafted polymer". The non-grafted polymer also constitutes part of the fine polymer particles (A) in accordance with one or more embodiments of the present invention. It can also be said that the non-grafted polymer is one that is not grafted to the elastic body (described later), out of polymers produced during formation of the graft part by polymerization.

In the present specification, the proportion of (i) the polymer which is grafted to the elastic body (described later) to (ii) the polymers produced during the formation of the graft part by polymerization, i.e., the proportion of the graft part, is referred to as a "graft rate". In other words, the graft rate is a value represented by the following expression: (weight of graft part)/{(weight of graft part)+(weight of non-grafted polymer)}×100.

The graft rate of the graft part may be not less than 70%, not less than 80%, or not less than 90%. In a case where the graft rate is not less than 70%, there is an advantage that the resin composition does not have an excessively high viscosity.

Note that in the present specification, the graft rate is calculated by the following method. First, an aqueous latex containing the fine polymer particles (A) is obtained. Next, a powder of the fine polymer particles (A) is obtained from the aqueous latex. A specific example of a method of obtaining the powder of the fine polymer particles (A) from the aqueous latex is a method of obtaining the powder of the fine polymer particles (A) by (i) causing the fine polymer particles (A) in the aqueous latex to coagulate, (ii) dehydrating a coagulate thus obtained, and (iii) further drying the coagulate. Next, 2 g of the powder of the fine polymer particles (A) is dissolved in 50 mL of methyl ethyl ketone (hereinafter also referred to as MEK). An MEK solution of the powder thus obtained is separated into a part soluble in MEK (MEK-soluble part) and a part insoluble in MEK (MEK-insoluble part). Specifically, the obtained MEK solution of the powder is subjected to centrifugal separation with use of a centrifugal separator (CP60E, manufactured by Hitachi Koki Co., Ltd.) at 30000 rpm for 1 hour, and thereby separated into the MEK-soluble part and the MEK-insoluble part. Note, here, that three sets of centrifugal separations are carried out in total. The weight of the MEK-soluble part and the weight of the MEK-insoluble part are measured, and then the graft rate is calculated with use of the following expression.

Graft rate (%)={(weight of methyl ethyl ketone insoluble part)−(weight of polymer other than graft part)}/(weight of polymer other than graft part)×100

Note that the weight of the polymer other than the graft part is the amount of a monomer introduced for formation of the polymer other than the graft part. The polymer other than the graft part is, for example, the elastic body. In a case where the fine polymer particles (A) contain a surface-crosslinked polymer (described later), the polymer other than the graft part includes both the elastic body and the surface-crosslinked polymer. In calculation of the graft rate, a method of causing the fine polymer particles (A) to coagulate is not limited to any particular one, and a method in which a solvent is used, a method in which a coagulant is used, a method in which the aqueous latex is sprayed, or the like can be employed.

(Glass Transition Temperature of Graft Part)

The glass transition temperature (hereinafter may be simply referred to as "Tg") of the graft part may be not higher than 190° C., not higher than 160° C., not higher than 140° C., or not higher than 120° C.

The Tg of the graft part can be determined by, for example, the composition of the structural unit contained in the graft part. In other words, it is possible to adjust the Tg of the resulting graft part, by changing the composition of the monomer used to produce (form) the graft part.

The Tg of the graft part is determined as follows. With use of a differential scanning calorimeter (DSC) (SSC-5200, manufactured by Seiko Instruments Inc.), measurement is carried out over a period during which a preliminary adjustment (the temperature of a sample is raised to 200° C. at a rate of 25° C./min and then kept for 10 minutes, and the temperature is lowered to 50° C. at a rate of 25° C./min) is carried out and then the temperature is raised to 200° C. at a rate of 10° C./min, to thereby obtain a DSC curve. Values of integral are found based on the obtained DSC curve, and the Tg is found from the local maximum of the values of the integral. In a case where there are a plurality of local maximums, the Tg of the graft part is found from the local maximum with the highest temperature.

(Variations of Graft Part)

In one or more embodiments of the present invention, the graft part may be constituted by only one type of graft part which has a structural unit having identical composition. In one or more embodiments of the present invention, the graft part may be constituted by plural types of graft parts which have structural units different from each other in composition.

In one or more embodiments of the present invention, a case where the graft part is constituted by plural types of graft parts will be described. In this case, the plural types of graft parts will be referred to as a graft part₁, a graft part₂, . . . a graft partₙ ("n" is an integer of 2 or more). The graft part may include a mixture obtained by mixing the graft part₁, the graft part₂ . . . , and the graft partₙ which are separately formed by polymerization. The graft part may include a polymer obtained by forming the graft part₁, the graft part₂, . . . , and the graft partₙ in order by polymerization. Forming a plurality of polymers (graft parts) in order by polymerization in this manner is also referred to as multistage polymerization. A polymer obtained by forming plural types of graft parts by multistage polymerization is also referred to as a multistage-polymerization graft part. A method of producing a multistage-polymerization graft part will be later described in detail.

In a case where the graft part is constituted by the plural types of graft parts, all of the plural types of graft parts do not need to be grafted to the elastic body. It is only necessary that at least part of at least one of the plural types of graft parts be grafted to the elastic body. The other of the plural types of graft parts may be grafted to the at least one of the plural types of graft parts which is grafted to the elastic body. In a case where the graft part is constituted by the plural types of graft parts, the graft part may have plural types of polymers which are identical in feature to the plural types of graft parts and which are not grafted to the elastic body (plural types of non-grafted polymers).

The multistage-polymerization graft part constituted by the graft part₁, the graft part₂, . . . the graft partₙ will be described. In the multistage-polymerization graft part, the graft partₙ can cover at least part of a graft partₙ₋₁ or the whole of the graft partₙ₋₁. In the multistage-polymerization graft part, part of the graft partₙ may be located inside the graft partₙ₋₁.

In the multistage-polymerization graft part, the graft parts may have a layer structure. For example, in a case where the multistage-polymerization graft part is constituted by the graft part₁, the graft part₂, and a graft parts, aspects of one or more embodiments of the present invention also include an aspect such that the graft part₁ forms the innermost layer of the graft part₁, a layer of the graft part₂ is present on the outer side of the graft part₁, and a layer of the graft part₃ is present on the outer side of the layer of the graft part₂ as the outermost layer. Thus, it can also be said that the multistage-polymerization graft part in which the graft parts have a layer structure is a multilayered graft part. In other words, in one or more embodiments of the present invention, the graft part may include a mixture of plural types of graft parts, a multistage-polymerization graft part, and/or a multilayered graft part.

In a case where the elastic body and the graft part are formed in this order by polymerization in production of the fine polymer particles (A), at least part of the graft part can cover at least part of the elastic body in the resulting fine polymer particles (A). The wording "the elastic body and the graft part are formed in this order by polymerization" can be reworded as follows: the elastic body and the graft part are formed by multistage polymerization. It can also be said that the fine polymer particles (A) obtained by forming the elastic body and the graft part by multistage polymerization is a multistage polymer.

In a case where the fine polymer particles (A) are constituted by a multistage polymer, the graft part can cover at least part of the elastic body or the whole of the elastic body. In a case where the fine polymer particles (A) are constituted by a multistage polymer, part of the graft part may be located inside the elastic body.

In a case where the fine polymer particles (A) are constituted by a multistage polymer, the elastic body and the graft part may have a layer structure. For example, aspects of one or more embodiments of the present invention also include an aspect such that the elastic body is present as the innermost layer (also referred to as a core layer) and a layer of the graft part is present on the outer side of the elastic body as the outermost layer (also referred to as a shell layer). It can also be said that a structure in which the elastic body is present as a core layer and the graft part is present as a shell layer is a core-shell structure. It can also be said that the fine polymer particles (A) which contain the elastic body and the graft part which have a layer structure (core-shell structure) are constituted by a multilayered polymer or a core-shell polymer. In other words, in one or more embodiments of the present invention, the fine polymer particles (A) may be constituted by a multistage polymer and/or a multilayered polymer or a core-shell polymer. Note, however, that the fine polymer particles (A) are not limited to the above feature, provided that the fine polymer particles (A) have the graft part.

At least part of the graft part may cover at least part of the elastic body. In other words, at least part of the graft part may be present on the outermost side of the fine polymer particles (A).

(Elastic Body)

The fine polymer particles (A) may further have the elastic body. That is, the fine polymer particles (A) may be constituted by a rubber-containing graft copolymer which has the elastic body and the graft part grafted to the elastic body. The following description will discuss one or more embodiments of the present invention while taking as an example a case where the fine polymer particles (A) are constituted by a rubber-containing graft copolymer.

The elastic body may include at least one type of elastic body selected from the group consisting of diene-based rubbers, (meth)acrylate-based rubbers, and polysiloxane rubber-based elastic bodies. The elastic body can also be referred to as rubber particles.

A case where the fine polymer particles (A) contain a diene-based rubber (case A) will be described. In the case A, in a case where the elastic body includes a diene-based rubber, the resulting resin composition can provide the cured product which has excellent toughness and impact resistance.

The diene-based rubber is an elastic body containing, as a structural unit, a structural unit derived from a diene-based monomer. The diene-based monomer can also be referred to as a conjugated diene-based monomer. In the case A, the diene-based rubber may contain (i) the structural unit derived from the diene-based monomer in an amount of 50% by weight to 100% by weight and (ii) a structural unit derived from a vinyl-based monomer, which is different from the diene-based monomer and which is copolymerizable with the diene-based monomer, in an amount of 0% by weight to 50% by weight, with respect to 100% by weight of structural units. In the case A, the diene-based rubber may contain, as a structural unit, a structural unit derived from a (meth)acrylate-based monomer in an amount smaller than the amount of the structural unit derived from the diene-based monomer.

Examples of the diene-based monomer encompass 1,3-butadiene, isoprene (2-methyl-1,3-butadiene), and 2-chloro-1,3-butadiene. These monomers may be used alone or in combination of two or more.

Examples of the vinyl-based monomer which is different from the diene-based monomer and which is copolymerizable with the diene-based monomer (hereinafter also referred to as vinyl-based monomer A) encompass: vinyl arenes such as styrene, α-methylstyrene, monochlorostyrene, and dichlorostyrene; vinyl carboxylic acids such as acrylic acid and methacrylic acid; vinyl cyanides such as acrylonitrile and methacrylonitrile; vinyl halides such as vinyl chloride, vinyl bromide, and chloroprene; vinyl acetate; alkenes such as ethylene, propylene, butylene, and isobutylene; and polyfunctional monomers such as diallylphthalate, triallyl cyanurate, triallyl isocyanurate, and divinylbenzene. These vinyl-based monomers which are different from the diene-based monomer may be used alone or in combination of two or more. Out of these vinyl-based monomers which are different from the diene-based monomer, styrene is particularly preferable. Note that, in the diene-based rubber in the case A, the structural unit derived from the vinyl-based monomer which is different from the diene-based monomer is an optional component. Note that, in the case A, the diene-based rubber may be constituted by only the structural unit derived from the diene-based monomer.

In the case A, the diene-based rubber may be (i) butadiene rubber which is constituted by a structural unit derived from 1,3-butadiene (also referred to as polybutadiene rubber) or (ii) butadiene-styrene rubber which is a copolymer of 1,3-butadiene and styrene (also referred to as polystyrene-butadiene). The diene-based rubber may be butadiene rubber. According to the above feature, since the fine polymer particles (A) contain the diene-based rubber, a desired effect can be more brought about. The butadiene-styrene rubber is more preferable in that the butadiene-styrene rubber makes it possible to, by adjustment of a refractive index, increase the transparency of the resulting cured product.

A case where the elastic body includes a (meth)acrylate-based rubber (case B) will be described. The case B allows wide-ranging polymer design for the elastic body by combinations of many types of monomers.

The (meth)acrylate-based rubber is an elastic body containing, as a structural unit, a structural unit derived from a (meth)acrylate-based monomer. In the case B, the (meth)acrylate-based rubber may contain (i) the structural unit derived from the (meth)acrylate-based monomer in an amount of 50% by weight to 100% by weight and (ii) a structural unit derived from a vinyl-based monomer, which is different from the (meth)acrylate-based monomer and which is copolymerizable with the (meth)acrylate-based monomer, in an amount of 0% by weight to 50% by weight, with respect to 100% by weight of structural units. In the case B, the (meth)acrylate-based rubber may contain, as a structural unit, a structural unit derived from a diene-based monomer in an amount smaller than the amount of the structural unit derived from the (meth)acrylate-based monomer.

Examples of the (meth)acrylate-based monomer encompass: alkyl (meth)acrylates such as methyl (meth)acrylate, ethyl (meth)acrylate, butyl (meth)acrylate, 2-ethylhexyl (meth)acrylate, octyl (meth)acrylate, dodecyl (meth)acrylate, stearyl (meth)acrylate, and behenyl (meth)acrylate;

aromatic ring-containing (meth)acrylates such as phenoxy-ethyl (meth)acrylate and benzyl (meth)acrylate; hydroxyal-kyl (meth)acrylates such as 2-hydroxyethyl (meth)acrylate and 4-hydroxybutyl (meth)acrylate; glycidyl (meth)acry-lates such as glycidyl (meth)acrylate and glycidyl alkyl (meth)acrylate; alkoxy alkyl (meth)acrylates; allyl alkyl (meth)acrylates such as allyl (meth)acrylate and allyl alkyl (meth)acrylate; and polyfunctional (meth)acrylates such as monoethylene glycol di(meth)acrylate, triethylene glycol di(meth)acrylate, and tetraethylene glycol di(meth)acrylate. These (meth)acrylate-based monomers may be used alone or in combination of two or more. Out of these (meth)acrylate-based monomers, ethyl (meth)acrylate, butyl (meth)acrylate, and 2-ethylhexyl (meth)acrylate are particularly preferable.

Examples of the vinyl-based monomer which is different from the (meth)acrylate-based monomer and which is copo-lymerizable with the (meth)acrylate-based monomer (here-inafter also referred to as vinyl-based monomer which is different from the (meth)acrylate-based monomer) encom-pass the monomers listed as the examples of the vinyl-based monomer A. Such vinyl-based monomers which are differ-ent from the (meth)acrylate-based monomer may be used alone or in combination of two or more. Out of such vinyl-based monomers which are different from the (meth) acrylate-based monomer, styrene is particularly preferable. Note that, in the (meth)acrylate-based rubber in the case B, the structural unit derived from the vinyl-based monomer which is different from the (meth)acrylate-based monomer is an optional component. Note that, in the case B, the (meth) acrylate-based rubber may be constituted by only the struc-tural unit derived from the (meth)acrylate-based monomer.

A case where the elastic body includes a polysiloxane rubber-based elastic body (case C) will be described. In the case C, the resulting resin composition can provide the cured product which has sufficient heat resistance and which has excellent impact resistance at low temperatures.

Example of the polysiloxane rubber-based elastic body encompass (a) polysiloxane-based polymers composed of alkyl or aryl disubstituted silyloxy units, such as dimethyl-silyloxy, diethylsilyloxy, methylphenylsilyloxy, diphenylsi-lyloxy, and dimethylsilyloxy-diphenylsilyloxy, and (b) poly-siloxane-based polymers composed of alkyl or aryl monosubstituted silyloxy units, such as organohydrogensi-lyloxy in which some of sidechain alkyls have been substi-tuted with a hydrogen atom. These polysiloxane-based poly-mers may be used alone or in combination of two or more. Out of these polysiloxane-based polymers, (a) a polymer composed of a dimethylsilyloxy unit, a methylphenylsily-loxy unit, and/or a dimethylsilyloxy-diphenylsilyloxy unit is preferable because the resulting resin composition can pro-vide the cured product which has excellent heat resistance, and (b) a polymer composed of a dimethylsilyloxy unit is most preferable because it can be easily acquired and is economical.

In the case C, the fine polymer particles (A) may contain the polysiloxane rubber-based elastic body in an amount of not less than 80% by weight, or not less than 90% by weight, with respect to 100% by weight of the elastic body contained in the fine polymer particles (A). According to the above feature, the resulting resin composition can provide the cured product which has excellent heat resistance.

The elastic body may further include an elastic body other than the diene-based rubber, the (meth)acrylate-based rub-ber, and the polysiloxane rubber-based elastic body. Examples of the elastic body other than the diene-based rubber, the (meth)acrylate-based rubber, and the polysi-loxane rubber-based elastic body encompass natural rubber.

(Crosslinked Structure of Elastic Body)

The elastic body may have a crosslinked structure intro-duced therein, from the viewpoint of maintenance of stable dispersion of the fine polymer particles (A) in a thermoset-ting resin. A generally used method may be used to introduce the crosslinked structure into the elastic body. Examples of the generally used method encompass the following. That is, in production of the elastic body, a crosslinking monomer(s), such as a polyfunctional monomer and/or a mercapto group-containing compound, is/are mixed with a monomer which can constitute the elastic body, and then polymerization is carried out. In the present specification, producing a polymer such as the elastic body is also referred to as forming a polymer by polymerization.

Examples of a method of introducing the crosslinked structure into the polysiloxane rubber-based elastic body encompass: (a) a method that involves also partially using a polyfunctional alkoxysilane compound together with another material during formation of the polysiloxane rub-ber-based elastic body by polymerization; (b) a method that involves introducing into the polysiloxane rubber-based elastic body a reactive group such as a reactive vinyl group or a mercapto group, thereafter adding e.g. an organic peroxide or a polymerizable vinyl monomer, and carrying out a radical reaction; and (c) a method that involves, during formation of the polysiloxane rubber-based elastic body by polymerization, mixing a crosslinking monomer(s), such as a polyfunctional monomer and/or a mercapto group-con-taining compound, together with another material and then carrying out polymerization.

Examples of the polyfunctional monomer encompass the polyfunctional monomers listed as the examples in the section (Graft part).

Examples of the mercapto group-containing compound encompass alkyl group-substituted mercaptan, allyl group-substituted mercaptan, aryl group-substituted mercaptan, hydroxy group-substituted mercaptan, alkoxy group-substi-tuted mercaptan, cyano group-substituted mercaptan, amino group-substituted mercaptan, silyl group-substituted mer-captan, acid group-substituted mercaptan, halo group-sub-stituted mercaptan, and acyl group-substituted mercaptan. The alkyl group-substituted mercaptan may be C1-C20 alkyl group-substituted mercaptan, or C1-C10 alkyl group-substi-tuted mercaptan. The aryl group-substituted mercaptan may be phenyl group-substituted mercaptan. The alkoxy group-substituted mercaptan may be C1-C20 alkoxy group-substi-tuted mercaptan, or C1-C10 alkoxy group-substituted mer-captan. The acid group-substituted mercaptan may be C1-C10 alkyl group-substituted mercaptan having a car-boxyl group or C1-C12 aryl group-substituted mercaptan having a carboxyl group.

(Glass Transition Temperature of Elastic Body)

The elastic body may have a glass transition temperature of not higher than 80° C., not higher than 70° C., not higher than 60° C., not higher than 50° C., not higher than 40° C., not higher than 30° C., not higher than 20° C., not higher than 10° C., not higher than 0° C., not higher than −20° C., not higher than −40° C., not higher than −45° C., not higher than −50° C., not higher than −55° C., not higher than −60° C., not higher than −65° C., not higher than −70° C., not higher than −75° C., not higher than −80° C., not higher than −85° C., not higher than −90° C., not higher than −95° C., not higher than −100° C., not higher than −105° C., not higher than −110° C., not higher than −115° C., not higher than −120° C., or not higher than −125° C. In the present specification, the "glass transition temperature" may be referred to as "Tg". According to the above feature, it is possible to obtain a powdery and/or granular material having a low Tg. As a result, the resin composition which contains the resulting powdery and/or granular material can provide the cured product or a molded product each of which has excellent toughness. The Tg of the elastic body can be obtained by carrying out viscoelasticity measurement with use of a planar plate made of the elastic body. Specifically, the Tg can be measured as follows: (1) a graph of tan δ is obtained by carrying out dynamic viscoelasticity measurement with respect to a planar plate made of the elastic body, with use of a dynamic viscoelasticity measurement device (for example, DVA-200, manufactured by IT Keisoku Seigyo Kabushikigaisha) under a tension condition; and (2) in the graph of tan δ thus obtained, the peak temperature of tan δ is regarded as the glass transition temperature. Note, here, that in a case where a plurality of peaks are found in the graph of tan δ, the lowest peak temperature is regarded as the glass transition temperature of the elastic body.

In view of prevention of a decrease in elastic modulus (i.e., a decrease in rigidity) of the resulting cured product, i.e., in view of obtainment of the cured product which has a sufficient elastic modulus (rigidity), the Tg of the elastic body may be higher than 0° C., may be not lower than 20° C., not lower than 50° C., not lower than 80° C., or not lower than 120° C.

The Tg of the elastic body can be determined by, for example, the composition of the structural unit contained in the elastic body. In other words, it is possible to adjust the Tg of the resulting elastic body, by changing the composition of the monomer used to produce (form) the elastic body.

Note, here, that monomers each of which, when polymerized to form a homopolymer (i.e., a polymer obtained by polymerizing only one type of monomer), provides a homopolymer having a Tg of higher than 0° C. will be referred to as a monomer group "a". Note also that monomers each of which, when polymerized to form a homopolymer (i.e., a polymer obtained by polymerizing only one type of monomer), provides a homopolymer having a Tg of lower than 0° C. will be referred to as a monomer group "b". Note also that an elastic body containing (i) one or more structural units derived from at least one type of monomer selected from the monomer group "a" in an amount of 50% by weight to 100% by weight (more preferably 65% by weight to 99% by weight) and (ii) one or more structural units derived from at least one type of monomer selected from the monomer group "b" in an amount of 0% by weight to 50% by weight (more preferably 1% by weight to 35% by weight) will be referred to as an elastic body X. The elastic body X has a Tg higher than 0° C. In a case where the elastic body includes the elastic body X, the resulting resin composition can provide the cured product which has sufficient rigidity.

Also in a case where the Tg of the elastic body is higher than 0° C., it is preferable that the crosslinked structure be introduced in the elastic body. Examples of a method of introducing the crosslinked structure into the elastic body encompass the above-described methods.

Examples of the monomers which can be included in monomer group "a" encompass, but are not limited to, unsubstituted vinyl aromatic compounds such as styrene and 2-vinyl naphthalene; vinyl-substituted aromatic compounds such as α-methyl styrene; ring-alkylated vinyl aromatic compounds such as 3-methylstyrene, 4-methylstyrene, 2,4-dimethylstyrene, 2,5-dimethylstyrene, 3,5-dimethylstyrene, and 2,4,6-trimethylstyrene; ring-alkoxylated vinyl aromatic compounds such as 4-methoxystyrene and 4-ethoxystyrene; ring-halogenated vinyl aromatic compounds such as 2-chlorostyrene and 3-chlorostyrene; ring-ester-substituted vinyl aromatic compounds such as 4-acetoxy styrene; ring-hydroxylated vinyl aromatic compounds such as 4-hydroxystyrene; vinyl esters such as vinyl benzoate and vinyl cyclohexanoate; vinyl halides such as vinyl chloride; aromatic monomers such as acenaphthalene and indene; alkyl methacrylates such as methyl methacrylate, ethyl methacrylate, and isopropyl methacrylate; aromatic methacrylates such as phenyl methacrylate; methacrylates such as isobornyl methacrylate and trimethylsilyl methacrylate; methacrylic acid derivative-containing methacryl monomers such as methacrylonitrile; certain types of acrylic acid esters such as isobornyl acrylate and tert-butyl acrylate; and acrylic acid derivative-containing acrylic monomers such as acrylonitrile. Examples of the monomers which can be included in the monomer group "a" further encompass monomers each of which, when polymerized, can provide a homopolymer having a Tg of not lower than 120° C., such as acrylamide, isopropyl acrylamide, N-vinylpyrrolidone, isobornyl methacrylate, dicyclopentanyl methacrylate, 2-methyl-2-adamanthyl methacrylate, 1-adamanthyl acrylate, and 1-adamanthyl methacrylate. These monomers "a" may be used alone or in combination of two or more.

Examples of monomers "b" encompass ethyl acrylate, butyl acrylate, 2-ethylhexyl acrylate, octyl (meth)acrylate, dodecyl (meth)acrylate, 2-hydroxyethyl acrylate, and 4-hydroxybutyl acrylate. These monomers "b" may be used alone or in combination of two or more. Out of these monomers "b", ethyl acrylate, butyl acrylate, and 2-ethylhexyl acrylate are particularly preferable.

(Volume-Average Particle Size of Elastic Body)

The elastic body may have a volume-average particle size of 0.03 μm to 50.00 μm, 0.05 μm to 10.00 μm, 0.08 μm to 2.00 μm, 0.10 μm to 1.00 μm, 0.10 μm to 0.80 μm, or 0.10 μm to 0.50 μm. In a case where the volume-average particle size of the elastic body is not less than 0.03 μm, the elastic body which has a desired volume-average particle size can be stably obtained. In a case where the volume-average particle size of the elastic body is not more than 50.00 μm, the resulting cured product or molded product has favorable heat resistance and impact resistance. The volume-average particle size of the elastic body can be measured with use of a dynamic light scattering type particle size distribution measurement apparatus using, as a test specimen, an aqueous latex containing the elastic body. A method of measuring the volume-average particle size of the elastic body will be described in detail in Examples below.

(Proportion of Elastic Body)

The proportion of the elastic body contained in the fine polymer particles (A) may be 40% by weight to 97% by weight, 60% by weight to 95% by weight, or 70% by weight to 93% by weight, where 100% by weight represents the entirety of the fine polymer particles (A). In a case where the proportion of the elastic body is not less than 40% by weight, the resulting resin composition can provide the cured product which has excellent toughness and impact resistance. In a case where the proportion of the elastic body is not more than 97% by weight, the fine polymer particles (A) do not easily agglutinate and, therefore, the resin composition does not have a high viscosity, so that the resulting resin composition can be excellent in handling.

(Gel Content of Elastic Body)

The elastic body may be one that can swell in an appropriate solvent but is substantially insoluble in the appropriate solvent. The elastic body may be insoluble in a thermosetting resin used.

The elastic body may have a gel content of not less than 60% by weight, not less than 80% by weight, not less than 90% by weight, or not less than 95% by weight. In a case where the gel content of the elastic body falls within the above range, the resulting resin composition can provide the cured product which has excellent toughness.

In the present specification, a method of calculating the gel content is as follows. First, an aqueous latex containing the fine polymer particles (A) is obtained. Next, a powdery and/or granular material of the fine polymer particles (A) is obtained from the aqueous latex. A method of obtaining the powdery and/or granular material of the fine polymer particles (A) from the aqueous latex is not limited to any particular one, and examples thereof encompass a method of obtaining the powdery and/or granular material of the fine polymer particles (A) by (i) causing the fine polymer particles (A) in the aqueous latex to aggregate, (ii) dehydrating an aggregate thus obtained, and (iii) further drying the aggregate. Next, 2.0 g of the powdery and/or granular material of the fine polymer particles (A) is dissolved in 50 mL of methyl ethyl ketone (MEK). An MEK solution of the powdery and/or granular material thus obtained is separated into a part soluble in MEK (MEK-soluble part) and a part insoluble in MEK (MEK-insoluble part). Specifically, the obtained MEK solution of the powdery and/or granular material is subjected to centrifugal separation with use of a centrifugal separator (CP60E, manufactured by Hitachi Koki Co., Ltd.) at 30000 rpm for 1 hour, and thereby separated into the MEK-soluble part and the MEK-insoluble part. Note, here, that three sets of centrifugal separations are carried out in total. The weight of the MEK-soluble part and the weight of the MEK-insoluble part are measured, and then the gel content is calculated with use of the following expression.

Gel content (%)=(weight of methyl ethyl ketone insoluble part)/{(weight of methyl ethyl ketone insoluble part)+(weight of methyl ethyl ketone soluble part)}×100

(Variations of Elastic Body)

In one or more embodiments of the present invention, the elastic body may be constituted by only one type of elastic body which has a structural unit having identical composition and which is selected from the group consisting of diene-based rubbers, (meth)acrylate-based rubbers, and polysiloxane rubber-based elastic bodies. In one or more embodiments of the present invention, the elastic body may be constituted by plural types of elastic bodies which have structural units different from each other in composition.

In one or more embodiments of the present invention, a case where the elastic body is constituted by plural types of elastic bodies will be described. In this case, the plural types of elastic bodies will be referred to as an elastic $body_1$, an elastic $body_2$, . . . and an elastic $body_n$. Note, here, that "n" is an integer of 2 or more. The elastic body may include a mixture obtained by mixing the elastic $body_1$, the elastic $body_2$, . . . , and the elastic $body_n$ which are separately formed by polymerization. The elastic body may include a polymer obtained by forming the elastic $body_1$, the elastic $body_2$, . . . , and the elastic $body_n$ by multistage polymerization. A polymer obtained by forming plural types of elastic bodies by multistage polymerization is also referred to as a multistage-polymerization elastic body. A method of producing a multistage-polymerization elastic body will be later described in detail.

A multistage-polymerization elastic body constituted by the elastic $body_1$, the elastic $body_2$, . . . and the elastic $body_n$ will be described. In the multistage-polymerization elastic body, the elastic $body_n$ can cover at least part of an elastic $body_{n-1}$ or the whole of the elastic $body_{n-1}$. In the multistage-polymerization elastic body, part of the elastic $body_n$ may be located inside the elastic $body_{n-1}$.

In the multistage-polymerization elastic body, the elastic bodies may have a layer structure. For example, in a case where the multistage-polymerization elastic body is constituted by the elastic $body_1$, the elastic $body_2$, and an elastic $body_3$, aspects of one or more embodiments of the present invention also include an aspect such that the elastic $body_1$ forms the innermost layer, a layer of the elastic $body_2$ is present on the outer side of the elastic $body_1$, and a layer of the elastic $body_3$ is present on the outer side of the layer of the elastic $body_2$ as the outermost layer of the elastic body. Thus, it can also be said that the multistage-polymerization elastic body in which the elastic bodies have a layer structure is a multilayered elastic body. In other words, in one or more embodiments of the present invention, the elastic body may include a mixture of plural types of elastic bodies, a multistage-polymerization elastic body, and/or a multilayered elastic body.

(Surface-Crosslinked Polymer)

The fine polymer particles (A) may have a surface-crosslinked polymer in addition to the elastic body and the graft part grafted to the elastic body. The above feature (a) allows an improvement of an anti-blocking property in the production of the fine polymer particles (A) and (b) makes the dispersibility of the fine polymer particles (A) in a thermosetting resin more favorable. Reasons for these are not limited to any particular ones, but can be inferred as follows. By the surface-crosslinked polymer covering at least part of the elastic body, the exposed area of the elastic body of the fine polymer particles (A) is reduced. Consequently, the elastic body is less likely to adhere to another elastic body, and therefore the dispersibility of the fine polymer particles (A) is improved.

In a case where the fine polymer particles (A) have the surface-crosslinked polymer, the following effects can be further brought about: (a) an effect of reducing the viscosity of the present resin composition; (b) an effect of increasing the crosslinking density of the elastic body; and (c) an effect of increasing the graft efficiency of the graft part. Note that the crosslinking density of the elastic body means a degree of the number of crosslinked structures in the entirety of the elastic body.

The surface-crosslinked polymer is constituted by a polymer containing, as structural units, (i) a structural unit derived from a polyfunctional monomer in an amount of 30% by weight to 100% by weight and (ii) a structural unit derived from any other vinyl-based monomer in an amount of 0% by weight to 70% by weight, which total 100% by weight.

Examples of the polyfunctional monomer which can be used to form the surface-crosslinked polymer by polymerization encompass the foregoing polyfunctional monomers. Out of such polyfunctional monomers, examples of a polyfunctional monomer which may be used to form the surface-crosslinked polymer by polymerization encompass allyl methacrylate, ethylene glycol di(meth)acrylate, butanediol di(meth)acrylate, hexanediol di(meth)acrylate, cyclohexane dimethanol di(meth)acrylate, and polyethylene glycol di(meth)acrylates. The above-listed polyfunctional monomers may be used alone or in combination of two or more.

The fine polymer particles (A) may contain the surface-crosslinked polymer which is formed by polymerization independently of formation of the rubber-containing graft copolymer by polymerization, or may contain the surface-crosslinked polymer which is formed together with the rubber-containing graft copolymer by polymerization. The fine polymer particles (A) may be a multistage polymer obtained by forming the elastic body, the surface-crosslinked polymer, and the graft part in this order by multistage polymerization. In any of these aspects, the surface-crosslinked polymer can cover at least part of the elastic body.

The surface-crosslinked polymer can also be regarded as part of the elastic body. In a case where the fine polymer particles (A) contain the surface-crosslinked polymer, the graft part may (a) be grafted to the elastic body other than the surface-crosslinked polymer, (b) be grafted to the surface-crosslinked polymer, or (c) be grafted to both the elastic body other than the surface-crosslinked polymer and the surface-crosslinked polymer. In a case where the fine polymer particles (A) contain the surface-crosslinked polymer, the above-described volume-average particle size of the elastic body means the volume-average particle size of the elastic body including the surface-crosslinked polymer.

A case will be described where the fine polymer particles (A) is a multistage polymer obtained by forming the elastic body, the surface-crosslinked polymer, and the graft part in this order by multistage polymerization (case D). In the case D, the surface-crosslinked polymer can cover part of the elastic body or the whole of the elastic body. In the case D, part of the surface-crosslinked polymer may be located inside the elastic body. In the case D, the graft part can cover part of the surface-crosslinked polymer or the whole of the surface-crosslinked polymer. In the case D, part of the graft part may be located inside the surface-crosslinked polymer. In the case D, the elastic body, the surface-crosslinked polymer, and the graft part may have a layer structure. For example, aspects of one or more embodiments of the present invention also include an aspect such that the elastic body is present as the innermost layer (core layer), a layer of the surface-crosslinked polymer is present on the outer side of the elastic body as an intermediate layer, and a layer of the graft part is present on the outer side of the surface-crosslinked polymer as the outermost layer (shell layer).

(Volume-Average Particle Size (Mv) of Fine Polymer Particles (A))

The fine polymer particles (A) may have a volume-average particle size (Mv) of 0.03 μm to 50.00 μm, 0.05 μm to 10.00 μm, 0.08 μm to 2.00 μm, 0.10 μm to 1.00 μm, 0.10 μm to 0.80 μm, or 0.10 μm to 0.50 μm because it is possible to obtain the resin composition which has a desired viscosity and which is highly stable. In a case where the volume-average particle size (Mv) of the fine polymer particles (A) falls within the above range, there is also an advantage that the dispersibility of the fine polymer particles (A) in a matrix resin is favorable. Note that, in the present specification, the "volume-average particle size (Mv) of the fine polymer particles (A)" means the volume-average particle size of the primary particles of the fine polymer particles (A) unless otherwise mentioned. The volume-average particle size of the fine polymer particles (A) can be measured with use of a dynamic light scattering type particle size distribution measurement apparatus using, as a test specimen, an aqueous latex containing the fine polymer particles (A). The volume-average particle size of the fine polymer particles (A) will be described in detail in Examples below. The volume-average particle size of the fine polymer particles (A) can also be measured by (i) cutting the cured product obtained from the resin composition, (ii) capturing an image of a cut surface with use of an electron microscope or the like, and (iii) using image data thus obtained (captured image).

The particle-number-based distribution of the particle size of the fine polymer particles (A) in a thermosetting resin may have a full width at half maximum which is not less than 0.5 times and not more than 1 time the volume-average particle size, because the resin composition which has a low viscosity and is easy to handle is obtained.

(1-5. Method of Producing Fine Polymer Particles (A) (Latex Producing Step))

In one or more embodiments of the present invention, the present production method may include a step of producing the fine polymer particles (A), particularly, a latex producing step of producing the latex which contains the fine polymer particles (A), as a step prior to the resin mixing step. The latex means an aqueous latex.

For example, the fine polymer particles (A) can be produced as follows: after any polymer is formed by polymerization, the polymer which constitutes the graft part is grafted to the any polymer in the presence of the any polymer. The following description will discuss an example of a method of producing the fine polymer particles (A), while taking as an example a case where the elastic body is formed by polymerization and then the polymer which constitutes the graft part is grafted to the elastic body in the presence of the elastic body to produce the fine polymer particles (A).

The fine polymer particles (A) can be produced by a known method, for example, a method such as emulsion polymerization, suspension polymerization, or microsuspension polymerization. Specifically, the formation of the elastic body contained in the fine polymer particles (A), the formation of the graft part contained in the fine polymer particles (A) (graft polymerization), the formation of the surface-crosslinked polymer contained in the fine polymer particles (A) can be each achieved by a known method, for example, a method such as emulsion polymerization, suspension polymerization, or microsuspension polymerization. Out of these methods, emulsion polymerization is particularly preferable as the method of producing the fine polymer particles (A), because it facilitates (i) compositional design of the fine polymer particles (A), (ii) industrial production, and (iii) obtainment of the aqueous latex of the fine polymer particles (A) which can be suitably used to produce the present resin composition. A method of producing the elastic body which can be contained in the fine polymer particles (A), a method of producing the graft part which can be contained in the fine polymer particles (A), and a method of producing the surface-crosslinked polymer which can be optionally contained in the fine polymer particles (A) will be described below.

(Method of Producing Elastic Body)

A case will be considered where the elastic body includes at least one type of elastic body selected from the group consisting of diene-based rubbers and (meth)acrylate-based rubbers. In this case, the elastic body can be produced by, for example, a method such as emulsion polymerization, suspension polymerization, or microsuspension polymerization. As the method of producing the elastic body, a method disclosed in, for example, WO 2005/028546 can be used.

A case will be considered where the elastic body includes a polysiloxane rubber-based elastic body. In this case, the elastic body can be produced by, for example, a method such as emulsion polymerization, suspension polymerization, or microsuspension polymerization. As the method of producing the elastic body, a method disclosed in, for example, WO 2006/070664 can be used.

The method of producing the elastic body in a case where the elastic body is constituted by plural types of elastic bodies (for example, an elastic $body_1$, an elastic $body_2$, . . . , an elastic $body_n$) will be described. In this case, the elastic $body_1$, the elastic $body_2$, . . . and the elastic $body_n$ are each formed individually by any of the above-described methods. Subsequently, these elastic bodies are mixed. In this manner, the elastic body which is constituted by the plural types of elastic bodies may be produced. Alternatively, the elastic $body_1$, the elastic $body_2$, . . . and the elastic $body_n$ may be formed in order by multistage polymerization to produce the elastic body which is constituted by the plural types of elastic bodies.

Formation of the elastic bodies by multistage polymerization will be described in detail. For example, (1) the elastic $body_1$ is formed by polymerization, (2) next, the elastic $body_2$ is formed by polymerization in the presence of the elastic $body_1$ to obtain a two-stage elastic $body_{1+2}$, (3) subsequently, an elastic $body_3$ is formed by polymerization in the presence of the elastic $body_{1+2}$ to obtain a three-stage elastic $body_{1+2+3}$, and (4) after a similar process(s) is/are carried out, the elastic $body_n$ is formed by polymerization in the presence of an elastic $body_{1+2+ . . . +(n-1)}$ to obtain a multistage-polymerization elastic $body_{1+2+ . . . +n}$.

(Method of Producing Graft Part)

The graft part can be formed, for example, by polymerizing, by known radical polymerization, the monomer used to form the graft part. In a case where (a) the elastic body is obtained as an aqueous latex or (b) a fine polymer particle precursor containing the elastic body and the surface-crosslinked polymer is obtained as an aqueous latex, the graft part may be formed by emulsion polymerization. The graft part can be produced by a method disclosed in, for example, WO 2005/028546.

The method of producing the graft part in a case where the graft part is constituted by plural types of graft parts (for example, a graft $part_1$, a graft $part_2$, . . . , a graft $part_n$) will be described. In this case, the graft $part_1$, the graft $part_2$, . . . and the graft $part_n$ are each formed individually by any of the above-described methods. Subsequently, these graft parts are mixed. In this manner, the graft part which is constituted by the plural types of graft parts may be produced. Alternatively, the graft $part_1$, the graft $part_2$, . . . the graft $part_n$ may be formed in order by multistage polymerization to produce the graft part which is constituted by the plural types of graft parts.

Formation of the graft parts by multistage polymerization will be described in detail. For example, (1) the graft $part_1$ is formed by polymerization, (2) next, the graft $part_2$ is formed by polymerization in the presence of the graft $part_1$ to obtain a two-stage graft $part_{1+2}$, (3) subsequently, a graft $part_3$ is formed by polymerization in the presence of the graft $part_{1+2}$ to obtain a three-stage graft $part_{1+2+3}$, and (4) after a similar process(s) is/are carried out, the graft $part_n$ is formed by polymerization in the presence of a graft $part_{1+2+ . . . +(n-1)}$ to obtain a multistage-polymerization graft $part_{1+2+ . . . +n}$.

In a case where the graft part is constituted by the plural types of graft parts, the fine polymer particles (A) may be produced as follows: the graft part which is constituted by the plural types of graft parts is formed by polymerization, and then these graft parts are grafted to the elastic body. Alternatively, the fine polymer particles (A) may be produced as follows: in the presence of the elastic body, plural types of polymers which constitute the plural types of graft parts are formed in order by multistage graft polymerization with respect to the elastic body.

(Method of Producing Surface-Crosslinked Polymer)

The surface-crosslinked polymer can be formed by polymerizing, by known radical polymerization, the monomer used to form the surface-crosslinked polymer. In a case where the elastic body is obtained as an aqueous latex, the surface-crosslinked polymer may be formed by emulsion polymerization.

In a case where emulsion polymerization is employed as the method of producing the fine polymer particles (A), a known emulsifying agent (dispersion agent) can be used in the production of the fine polymer particles (A).

In a case where emulsion polymerization is employed as the method of producing the fine polymer particles (A), a pyrolytic initiator can be used in the production of the fine polymer particles (A). It is possible to use, as the pyrolytic initiator, a known initiator such as 2,2'-azobisisobutyronitrile, hydrogen peroxide, potassium persulfate, and/or ammonium persulfate, for example.

In the production of the fine polymer particles (A), a redox initiator can also be used. The redox initiator is an initiator which contains a combination of (a) a peroxide such as an organic peroxide and/or an inorganic peroxide and (b) as necessary a reducing agent such as sodium formaldehyde sulfoxylate and/or glucose, as necessary a transition metal salt such as iron (II) sulfate, as necessary a chelating agent such as disodium ethylenediaminetetraacetate, and/or as necessary a phosphorus-containing compound such as sodium pyrophosphate.

Examples of the organic peroxide encompass t-butylperoxy isopropyl carbonate, paramenthane hydroperoxide, cumene hydroperoxide, dicumyl peroxide, t-butyl hydroperoxide, di-t-butyl peroxide, and t-hexyl peroxide. Examples of the inorganic peroxide encompass hydrogen peroxide, potassium persulfate, and ammonium persulfate.

Using the redox initiator makes it possible to (i) carry out polymerization even at a low temperature at which pyrolysis of the peroxide substantially does not occur and (ii) select a polymerization temperature from a wide range of temperatures. Thus, using the redox initiator is preferable. Out of redox initiators, organic peroxides such as cumene hydroperoxide, dicumyl peroxide, paramenthane hydroperoxide, and t-butyl hydroperoxide are more preferable for use as the redox initiator. The amount of the initiator used can be within a known range. In a case where the redox initiator is used, the amounts of, for example, the reducing agent used, the transition metal salt used, and the chelating agent used can be within known ranges.

In a case where, in the formation of the elastic body, the graft part, or the surface-crosslinked polymer by polymerization, a polyfunctional monomer is used to introduce a crosslinked structure into the elastic body, the graft part, or the surface-crosslinked polymer, a known chain transfer agent can be used in an amount within a known range. By using the chain transfer agent, it is possible to easily adjust the molecular weight and/or the degree of crosslinking of the resulting elastic body, graft part, or surface-crosslinked polymer.

In the production of the fine polymer particles (A), a surfactant can be further used, in addition to the above-described components. The type and the amount of the surfactant used are set within known ranges.

In the production of the fine polymer particles (A), conditions of polymerization such as polymerization temperature, pressure, and deoxygenation can be set within known ranges.

(1-6. Resin (B))

The resin (B) is not particularly limited in its properties, provided that the resin (B) is, at 25° C., a liquid having a viscosity of 100 mPa·s to 1,000,000 mPa·s, a semisolid, or a solid. Note that the wording "the resin (B) is, at 25° C., . . . having a viscosity of 100 mPa·s to 1,000,000 mPa·s" means that "the resin (B) which is at 25° C. has a viscosity of 100 mPa·s to 1,000,000 mPa·s".

In a case where the resin (B) is a liquid, the viscosity of the resin (B) may be not more than 750,000 mPa·s, not more than 700,000 mPa·s, not more than 500,000 mPa·s, not more than 350,000 mPa·s, not more than 300,000 mPa·s, not more than 250,000 mPa·s, not more than 100,000 mPa·s, not more than 75,000 mPa·s, not more than 50,000 mPa·s, not more than 30,000 mPa·s, not more than 25,000 mPa·s, not more than 20,000 mPa·s, or not more than 15,000 mPa·s, at 25° C. According to the above feature, the resin (B) has an advantage of having excellent flowability.

The viscosity of the resin (B) may be not less than 200 mPa·s, not less than 300 mPa·s, not less than 400 mPa·s, not less than 500 mPa·s, not less than 750 mPa·s, not less than 1000 mPa·s, or not less than 1500 mPa·s, at 25° C. According to the above feature, the resin (B) is not impregnated into the fine polymer particles (A). Therefore, the resin (B) allows prevention of fusion between the fine polymer particles (A).

The viscosity of the resin (B) may be 100 mPa·s to 750,000 mPa·s, 100 mPa·s to 700,000 mPa·s, 100 mPa·s to 350,000 mPa·s, 100 mPa·s to 300,000 mPa·s, 100 mPa·s to 50,000 mPa·s, 100 mPa·s to 30,000 mPa·s, or 100 mPa·s to 15,000 mPa s, at 25° C.

In a case where the resin (B) is a semisolid, it can be said that the resin (B) is a semiliquid, and it can be said that the resin (B) has a viscosity of more than 1,000,000 mPa·s. In a case where the resin (B) is a semisolid or a solid, the resin composition which contains the resulting powdery and/or granular material has an advantage of being less sticky and easy to handle.

The viscosity of the resin (B) can be measured by a viscometer. A method of measuring the viscosity of the resin (B) will be described in detail in Examples below.

Further, the viscosity of the resin (B) may be not less than 100 mPa·s, not less than 500 mPa·s, not less than 1000 mPa·s, or not less than 1500 mPa·s, at 25° C., because such a viscosity allows the resin (B) to get between the fine polymer particles (A) and thereby allows prevention of fusion between the fine polymer particles (A).

Further, in a case where a matrix resin is a thermosetting resin, the viscosity of the resin (B) at 25° C. may be equal to or lower than a value obtained by adding 50000 mPa·s to the viscosity of such a thermosetting matrix resin at 25° C. In view of facilitating uniform mixing of the resin (B) and the thermosetting matrix resin, in a case where the viscosity of the resin (B) at 25° C. is equal to or higher than the viscosity of the thermosetting matrix resin at 25° C., the viscosity of the resin (B) at 25° C. may be equal to or lower than a value obtained by adding 20000 mPa·s to the viscosity of the thermosetting matrix resin at 25° C., equal to or lower than a value obtained by adding 10000 mPa·s to the viscosity of the thermosetting matrix resin at 25° C., equal to or lower than a value obtained by adding 5000 mPa·s to the viscosity of the thermosetting matrix resin at 25° C., or equal to or lower than a value obtained by adding 0 mPa·s to the viscosity of the thermosetting matrix resin at 25° C.

The resin (B) may have an endothermic peak at not higher than 25° C., or not higher than 0° C., in its differential scanning calorimetry (DSC) thermogram.

The resin (B) may be identical to or different from a thermosetting resin which is a matrix resin (described later) with which the resin composition is mixed. As an example, a case will be considered where the resin (B) is used in the method of producing a resin composition and the resin (B) is of the same type as that of the matrix resin. In this case, it is not possible to distinguish between the matrix resin and the resin (B) in the obtained resin composition. Therefore, the obtained resin composition appears to have merely the matrix resin in addition to the fine polymer particles (A). Next, a case will be considered where the resin (B) is used in the method of producing a resin composition and the resin (B) is of a type different from that of a matrix resin. In this case, it is possible to distinguish between the matrix resin and the resin (B) in the obtained resin composition. In this case, the ultimately obtained resin composition can contain the resin (B) as a resin other than the matrix resin, in addition to the fine polymer particles (A).

The resin (B) can be, for example, a thermosetting resin, a thermoplastic resin, or any combination of a thermosetting resin and a thermoplastic resin. In a case where the present resin composition contains the resin (B), the resin (B) can have an effect of enhancing the dispersibility of the fine polymer particles (A) in a thermosetting resin.

Examples of the thermosetting resin which is the resin (B) encompass various thermosetting resins described later in the section of a matrix resin. As the resin (B), the thermosetting resins may be used alone or in combination of two or more.

Examples of the thermoplastic resin which is the resin (B) encompass polymers each containing, as one or more structural units, one or more structural units derived from at least one type of monomer selected from the group consisting of aromatic vinyl monomers, vinyl cyanide monomers, and (meth)acrylate monomers. As the resin (B), the thermoplastic resins may be used alone or in combination of two or more.

In a case where a matrix resin with which the resin composition that is the agglutinate containing the fine polymer particles (A) and the resin (B) is mixed is a thermosetting resin, the resin (B) may be of the same type as that of the thermosetting resin which is the matrix resin, because such a resin (B) is less likely to affect various physical properties. That is, in a case where a thermosetting resin which is a matrix resin is an epoxy resin, it is preferable that the resin (B) be also an epoxy resin. In a case where the resin (B) is different from a thermosetting resin which is a matrix resin, the resin (B) may be compatible with the thermosetting resin which is the matrix resin.

In a case where the total amount of the fine polymer particles (A) and the resin (B) is regarded as 100% by weight, the amount of the fine polymer particles (A) may be 10% by weight to 60% by weight and the amount of the resin (B) may be 90% by weight to 40% by weight, the amount of the fine polymer particles (A) may be 20% by weight to 50% by weight and the amount of the resin (B) may be 80% by weight to 50% by weight, or the amount of the fine polymer particles (A) may be 25% by weight to 45% by weight and the amount of the resin (B) may be 75% by weight to 55% by weight, from the viewpoint of the viscosity.

(Others)

In the present specification, fats and oils as well as fatty acid esters are also included in the resin (B). Examples of the fats and oils which can be suitably used as the resin (B) encompass epoxidized fats and oils such as epoxidized soybean oil and epoxidized linseed oil. Commercially available epoxidized soybean oil can also be used, and examples thereof encompass ADK CIZER O-130P manufactured by ADEKA Co., Ltd. Examples of the fatty acid esters which can be suitably used as the resin (B) encompass epoxidized fatty acid esters such as epoxidized fatty acid butyl, epoxidized fatty acid 2-ethylhexyl, epoxidized fatty acid octyl ester, and epoxidized fatty acid alkyl ester.

The epoxidized fats and oils and the epoxidized fatty acid esters are sometimes referred to as epoxy-based plasticizers. That is, in the present specification, epoxy-based plasticizers are also included in the resin (B). Examples of the epoxy-based plasticizers, other than the epoxidized fats and oils and the epoxidized fatty acid esters, encompass diepoxystearyl epoxyhexahydrophthalate and epoxyhexahydro Di(2-ethylhexyl)phthalate.

The above-described thermosetting resins, thermoplastic resins, mixtures of the thermosetting resins and the thermoplastic resins, fats and oils, and fatty acid esters can be each used in admixture with an antioxidant. In the present specification, the antioxidant is regarded as part of the resin (B), as long as the antioxidant is used in admixture with each of the above-described substances. In a case where only the antioxidant is used, the antioxidant is not regarded as the resin (B).

The antioxidant is not limited to any particular one. Examples of the antioxidant encompass (a) primary antioxidants such as phenol-based antioxidants, amine-based antioxidants, lactone-based antioxidants, and hydroxylamine-based antioxidants and (b) secondary antioxidants such as sulfur-based antioxidants and phosphorus-based antioxidants.

Examples of the phenol-based antioxidants encompass hindered phenol-based antioxidants. Examples of the hindered phenol-based antioxidants encompass a compound having a hindered phenol structure or a semi-hindered phenol structure in its molecule. Commercially available phenol-based antioxidants can also be used, and examples thereof encompass Irganox 245 (manufactured by BASF Japan Ltd.).

The amine-based antioxidants are not limited to any particular ones, and a wide range of conventionally known amine-based antioxidants can be used. Specific examples of the amine-based antioxidants encompass amine-ketone-based compounds such as a 2,2,4-trimethyl-1,2-dihydroquinoline polymer, 6-ethoxy-1,2-dihydro-2,2,4-trimethylquinoline, and a reaction product of diphenylamine and acetone.

The amine-based antioxidants also encompass aromatic amine compounds. Examples of the aromatic amine compounds encompass naphthylamine-based antioxidants, diphenylamine-based antioxidants, and p-phenylenediamine-based antioxidants.

The lactone-based antioxidants, the hydroxylamine-based antioxidants, and the sulfur-based antioxidants are not limited to any particular ones. A wide range of conventionally known lactone-based antioxidants, hydroxylamine-based antioxidants, and sulfur-based antioxidants can be used.

The phosphorus-based antioxidants are not limited to any particular ones, and a wide range of conventionally known phosphorus-based antioxidants can be used. Phosphoric acid and phosphoric ester, each of which contains active hydrogen, can adversely affect the storage stability of the resulting resin composition which contains the powdery and/or granular material, and can adversely affect the heat resistance of the cured product or the molded product provided by the resin composition. Therefore, as the phosphorus-based antioxidants, alkyl phosphite, aryl phosphite, alkyl aryl phosphite compounds, and the like which do not contain phosphoric acid or phosphoric ester in their molecules are preferable.

Alternatively, the antioxidant can be any other conventionally known substance. Examples of such an antioxidant encompass various substances described in, for example, "Sanka Boshizai Handobukku (Antioxidant Handbook)" published by Taiseisha (the date of publication of the first edition: Oct. 25, 1976), "Kobunshitenkazai handobukku (Polymeric additive Handbook)" published by CMC Publishing Co., Ltd. (the author and editor: HARUNA, Toru, the date of publication of the first edition: Nov. 7, 2010), and the like.

The resin (B) may be at least one selected from the group consisting of the thermosetting resins, mixtures of the thermosetting resins and the antioxidants, the thermoplastic resins, mixtures of the thermoplastic resins and the antioxidants, the fats and oils, mixtures of the fats and oils and the antioxidants, the fatty acid esters, mixtures of the fatty acid esters and the antioxidants, epoxy curing agents, and mixtures of the epoxy curing agents and the antioxidants, at least one selected from the group consisting of epoxy resins, acrylic polymers, mixtures of the epoxy resins and the antioxidants, mixtures of the acrylic polymers and the antioxidants, and mixtures of the epoxy-based plasticizers and the antioxidants, at least one selected from the group consisting of the mixtures of the epoxy resins and the antioxidants, the mixtures of the acrylic polymers and the antioxidants, and the mixtures of the epoxy-based plasticizers and the antioxidants, or any of the mixtures of the epoxy-based plasticizers and the antioxidants. According to the above feature, the resulting resin composition which contains the powdery and/or granular material has advantages that (a) it is possible to provide the cured product or the molded product each of which has excellent heat resistance and (b) it is possible to improve the dispersibility of the fine polymer particles (A) in a matrix resin.

[2. Resin Composition]

A resin composition in accordance with one or more embodiments of the present invention is a resin composition containing: fine polymer particles (A) which have a graft part that is constituted by a polymer containing, as one or more structural units, one or more structural units derived from at least one type of monomer selected from the group consisting of aromatic vinyl monomers, vinyl cyanide monomers, and (meth)acrylate monomers; and a resin (B) which has a viscosity of not more than 1,000,000 mPa·s at 25° C., in a case where a total amount of the fine polymer particles (A) and the resin (B) is regarded as 100% by weight, an amount of the fine polymer particles (A) being 30% by weight to 70% by weight and an amount of the resin (B) being 30% by weight to 70% by weight. The present resin composition can be, for example, an object to be subjected to the above-described washing step. In other words, the present resin composition can be referred to as a resin composition which has not been subjected to the washing step.

As has been described, the present resin composition takes dough form or crumb form, depending on the weight ratio between the fine polymer particles (A) and the resin (B). These forms allow an improvement in operability during the washing step. For example, the resin composition in liquid form has a specific gravity greater than that of water. Therefore, in a case where, during the washing step, the resin composition is left to stand still so as to be separated from water, the resin composition forms a lower layer. In this case, there is a restriction that a washing operation can be carried out only a single time. In a case where the resin composition needs to be washed a plurality of times, it is necessary to move the resin composition into another container once, wipe away rinse water, and then take the resin composition back into a washing tank. This complicates the operation.

In contrast, in a case where the resin composition is in dough form or crumb form, it is possible to stop, with use of a metal gauze, the resin composition from flowing out. Therefore, the rinse water can be easily wiped away. Furthermore, there are advantages that the resin composition can be washed repeatedly and fewer facilities are required. Moreover, in a case where the resin composition is in the dough form or crumb form, it is possible to wash the resin composition by not only kneading but also stirring. This allows a wider variety of devices from which to choose.

The present resin composition can be produced by a step(s) carried out before the washing step is carried out in the above-described method of producing a resin composition.

The present resin composition may have a size of not less than 0.3 mm, not less than 1 mm, or not less than 3 mm. This size makes the operability during the washing step (in particular, when the rinse water is wiped away) favorable.

The present resin composition may be arranged such that sulfur (S) or phosphorus (P) contained in the resin composition is removed by not less than 10% by single washing. S or P contained in the resin composition may be removed by not less than 15%, not less than 20%, not less than 25%, or not less than 30%, by single washing.

Note, here, that the wording "single washing" means the following. In a case where the resin composition is in dough form, the wording means the washing step (single time) in which 1 part by weight of the resin composition is mixed with 1.5 parts by weight of ion exchanged water at 90° C. and a resulting mixture is stirred for 30 minutes. In a case where the resin composition is in crumb form, the wording means the washing step (single time) in which 1 part by weight of the resin composition is kneaded with 0.3 parts by weight of ion exchanged water at 30° C. Whether S or P has been removed by not less than 10% can be determined by measuring the amount of S or P contained in the resin composition before and after the washing step (single time). Note that the washing step (single time) in determination of whether the S or P has been "removed by not less than 10%" is not limited to the first washing, and can be alternatively the second or subsequent washing. In a case where the washing step is carried out a plurality of times, the S or P may be "removed by not less than 10%" by each washing. Alternatively, the S or P may be "removed by not less than 10%" only by washing with the highest removing efficiency.

According to the present resin composition, it is possible to remove S or P, each of which is an impurity, by not less than 10% by carrying out the washing step a single time as described above. It is therefore possible to reduce the number of times the washing step, for washing away impurities, is carried out. That the amounts of S and P are small means that the amounts of impurities which are derived from an emulsifying agent are small, and means that the amounts of impurities and/or contaminants (water-soluble compounds) which are derived from an emulsifying agent, a flocculant (mineral salt), and/or metallic soap are small. Therefore, the resin composition is suitable for use in electronic materials and the like. This is because a water-soluble compound causes corrosion, insulation failure, and/or migration of substrate wiring and/or a lead of an element.

The present resin composition can be obtained by, for example, the above-described method of producing a resin composition.

(Organic Solvent)

The present resin composition substantially does not contain an organic solvent. The wording "substantially does not contain an organic solvent" means that the resin composition contains an organic solvent in an amount of not more than 100 ppm.

The amount of the organic solvent contained in the present resin composition (also referred to as a solvent content) may be not more than 100 ppm, not more than 50 ppm, not more than 25 ppm, or not more than 10 ppm. It can also be said that the amount of the organic solvent contained in the present resin composition is the amount of a volatile component (other than water) contained in the present resin composition. The amount of the organic solvent (volatile component) contained in the present resin composition can be determined, for example, as follows. That is, a given amount of the resin composition is heated with use of a hot air dryer or the like, the weight of the resin composition is measured before and after heating, and the amount of decrease in weight is regarded as the amount of the organic solvent. Alternatively, the amount of the organic solvent (volatile component) contained in the present resin composition can also be determined by gas chromatography. In a case where an organic solvent is not used in the production of the present resin composition, the amount of the organic solvent contained in the resulting resin composition can be regarded as 0 ppm.

Examples of the organic solvent which is substantially not contained in the present resin composition encompass (a) esters such as methyl acetate, ethyl acetate, propyl acetate, and butyl acetate, (b) ketones such as acetone, methyl ethyl ketone, diethyl ketone, and methyl isobutyl ketone, (c) alcohols such as ethanol, (iso)propanol, and butanol, (d) ethers such as tetrahydrofuran, tetrahydropyran, dioxane, and diethyl ether, (e) aromatic hydrocarbons such as benzene, toluene, and xylene, and (f) halogenated hydrocarbons such as methylene chloride and chloroform.

(Amounts of S and P)

The amounts of S and P contained in the present resin composition can be measured with use of an X-ray fluorescence analyzer or by liquid chromatography. S and P contained in the present resin composition are each an element derived from, for example, an emulsifying agent. The resin composition can contain S in a case where the emulsifying agent is a sulfur-based emulsifying agent. The resin composition can contain P in a case where the emulsifying agent is a phosphorus-based emulsifying agent. The amounts of S and P contained in the present resin composition can be referred to as a remaining emulsifying agent content.

According to the present resin composition, the amount of S or P contained in the resin composition, which amount is measured with use of an X-ray fluorescence analyzer, may be not more than 1000 ppm, not more than 500 ppm, not more than 100 ppm, not more than 60 ppm, or not more than 50 ppm, in the resin composition.

(2-3. Other Features)

It is preferable that in a case where the present resin composition is placed on an 8-mesh metal gauze at 25° C. for 10 minutes, the present resin composition do not pass through the metal gauze. It is more preferable that in a case where the present resin composition is placed on a 16-mesh metal gauze at 25° C. for 10 minutes, the present resin composition do not pass through the metal gauze. It is even more preferable that in a case where the present resin composition is placed on a 30-mesh metal gauze at 25° C. for 10 minutes, the present resin composition do not pass through the metal gauze. It is still more preferable that in a case where the present resin composition is placed on a 50-mesh metal gauze at 25° C. for 10 minutes, the present resin composition do not pass through the metal gauze. This feature makes the operability during the washing step (in particular, when the rinse water is wiped away) favorable. Note, here, that the wording "not pass through the metal gauze" means that in a case where the present resin composition is placed on a metal gauze for 10 minutes, the resin which has passed through the metal gauze is not more than 5%.

The fine polymer particles (A) and the resin (B) are similar to those described in connection with the method of producing a resin composition, and the description of Embodiment 1 can apply. In particular, the fine polymer particles (A) may be constituted by a rubber-containing graft copolymer which has an elastic body and a graft part grafted to the elastic body. The elastic body may include at least one type of elastic body selected from the group consisting of diene-based rubbers, (meth)acrylate-based rubbers, and polysiloxane rubber-based elastic bodies.

The resin (B) may be a thermosetting resin. In particular, the thermosetting resin may be at least one type of thermosetting resin selected from the group consisting of: ethylenically unsaturated monomers; epoxy resins; phenolic resins; polyol resins; and amino-formaldehyde resins (melamine resins).

According to the above feature, while the characteristics (heat resistance, rigidity, and the like) of a liquid thermosetting resin are maintained, the fracture toughness, the adhesion strength, the surface impact resistance, and the like can be improved.

[3. Resin Composition (Mixture of Present Resin Composition and Matrix Resin)]

One or more embodiments of the present invention can also include, as embodiments, a resin composition obtained by mixing the above-described resin composition and a matrix resin. In other words, the present resin composition contains the above-described resin composition and a matrix resin.

(3-1. Matrix Resin)

As the matrix resin, a thermosetting resin can be suitably used. The thermosetting resin may include at least one type of thermosetting resin selected from the group consisting of: resins each containing a polymer obtained by polymerization of an ethylenically unsaturated monomer; epoxy resins; phenolic resins; polyol resins; and amino-formaldehyde resins (melamine resins). Examples of the thermosetting resin also encompass resins each containing a polymer obtained by polymerization of an aromatic polyester raw material. Examples of the aromatic polyester raw material encompass radical-polymerizable monomers such as aromatic vinyl compounds, (meth)acrylic acid derivatives, vinyl cyanide compounds, and maleimide compounds; dimethyl terephthalate; and alkylene glycol. These thermosetting resins may be used alone or in combination of two or more.

(Ethylenically Unsaturated Monomer)

The ethylenically unsaturated monomer is not limited to any particular one, provided that the ethylenically unsaturated monomer has at least one ethylenically unsaturated bond in its molecule.

Examples of the ethylenically unsaturated monomer encompass acrylic acid, α-alkyl acrylic acids, α-alkyl acrylic acid esters, β-alkyl acrylic acids, β-alkyl acrylic acid esters, methacrylic acid, esters of acrylic acid, esters of methacrylic acid, vinyl acetate, vinyl esters, unsaturated esters, polyunsaturated carboxylic acids, polyunsaturated esters, maleic acid, maleic acid esters, maleic anhydride, and acetoxy styrene. These ethylenically unsaturated monomers may be used alone or in combinations of two or more.

(Epoxy Resins)

The epoxy resins are not limited to any particular ones, provided that the epoxy resins each have at least one epoxy bond in its molecule.

Specific examples of the epoxy resins encompass bisphenol A epoxy resin, bisphenol F epoxy resin, bisphenol AD epoxy resin, bisphenol S epoxy resin, glycidyl ester type epoxy resin, glycidyl amine type epoxy resin, novolac type epoxy resin, glycidyl ether epoxy resin of bisphenol A propylene oxide adduct, hydrogenated bisphenol A (or F) epoxy resin, fluorinated epoxy resin, rubber-modified epoxy resin containing polybutadiene or NBR, flame-resistant epoxy resin such as glycidyl ether of tetrabromo bisphenol A, p-oxybenzoic acid glycidyl ether ester type epoxy resin, m-aminophenol type epoxy resin, diaminodiphenylmethane-based epoxy resin, urethane-modified epoxy resin containing urethane bond, various types of alicyclic epoxy resin, glycidyl ether of a polyhydric alcohol, hydantoin-type epoxy resin, epoxidized unsaturated polymer such as petroleum resin, and amino-containing glycidyl ether resin.

Examples of the polyhydric alcohol encompass N,N-diglycidyl aniline, N,N-diglycidyl-o-toluidine, triglycidyl isocyanurate, polyalkylene glycol diglycidyl ether, and glycerin. Other examples of the epoxy resins encompass an epoxy compound obtained by causing an addition reaction between one of the above epoxy resins and e.g. a bisphenol A (or F) or a polybasic acid. The epoxy resins are not limited to these examples. Typically used epoxy resins can be used as the epoxy resins. These epoxy resins may be used alone or in combination of two or more.

Out of these epoxy resins, epoxy resins each of which has at least two epoxy groups in one molecule are preferable in that, e.g., such resins have high reactivity during curing of the resin composition and make it easy for an obtained cured product to create a three-dimensional mesh. In addition, out of the epoxy resins each of which has at least two epoxy groups in one molecule, epoxy resins each of which contains a bisphenol type epoxy resin as a main component are preferable, because they are economical and easily available.

(Phenolic Resins)

The phenolic resins are not limited to any particular ones, provided that the phenolic resins are each a compound obtained through a reaction between a phenol and an aldehyde. The phenol is not limited to any particular one, and examples thereof encompass phenols such as phenol, ortho-cresol, meta-cresol, para-cresol, xylenol, para-tertiary butylphenol, para-octylphenol, para-phenylphenol, bisphenol A, bisphenol F, and resorcin. In particular, phenol and cresol are preferred as the phenol.

The aldehyde is not limited to any particular one, and examples thereof encompass formaldehyde, acetaldehyde, butylaldehyde, and acrolein, and mixtures thereof. Alternatively, substances which are sources of the above aldehydes or solutions of the above aldehydes can be used. The aldehyde may be formaldehyde because an operation for reacting the phenol and the aldehyde is easy.

The molar ratio (F/P) between the phenol (P) and the aldehyde (F) in a reaction between the phenol and the aldehyde (such a molar ratio may be hereinafter referred to as a "reaction molar ratio") is not limited to any particular one. In a case where an acid catalyst is used in the reaction, the reaction molar ratio (F/P) may be 0.4 to 1.0, or 0.5 to 0.8. In a case where an alkali catalyst is used in the reaction, the reaction molar ratio (F/P) may be 0.4 to 4.0, or 0.8 to 2.5. In a case where the reaction molar ratio is equal to or higher than the above lower limit, a yield is less likely to excessively decrease and a resulting phenolic resin is less likely to have a low molecular weight. On the contrary, in a case where the reaction molar ratio is equal to or lower than the above upper limit, the phenolic resin is less likely to have an excessively high molecular weight and an excessively high softening point, and it is therefore possible to achieve sufficient flowability during heating. Furthermore, in a case where the reaction molar ratio is equal to or lower than the above upper limit, the molecular weight is easily controlled, and gelation may be less likely to occur or a partially gelatinized product may be less likely to be formed, each of which results from the conditions under which the reaction takes place.

(Polyol Resins)

The polyol resins are each a compound containing two or more active hydrogens as its terminal group(s), and are each bi- or more functional polyol with a molecular weight of about 50 to 20,000. Examples of the polyol resins encompass aliphatic alcohols, aromatic alcohols, polyether type polyols, polyester type polyols, polyolefin polyols, and acrylic polyols.

The aliphatic alcohols may be dihydric alcohols or trihydric or higher polyhydric alcohols (such as trihydric alcohols or tetrahydric alcohols). Examples of the dihydric alcohols encompass: alkylene glycols (in particular, alkylene glycols having about 1 to 6 carbon atoms) such as ethylene glycol, propylene glycol, 1,3-propanediol, 1,3-butanediol, 1,4-butanediol, 1,5-pentanediol, 1,6-hexanediol, 3-methyl-1,5-pentanediol, and neopentylglycol; and substances obtained through dehydrogenative condensation of two or more molecules (e.g., about two to six molecules) of any of the above alkylene glycols (such as diethylene glycol, dipropylene glycol, and tripropylene glycol). Examples of the trihydric alcohols encompass glycerin, trimethylolpropane, trimethylolethane, and 1,2,6-hexanetriol (in particular, trihydric alcohols having about 3 to 10 carbon atoms). Examples of the tetrahydric alcohols encompass pentaerythritol and diglycerin. Other examples encompass saccharides such as monosaccharides, oligosaccharides, and polysaccharides.

Examples of the aromatic alcohols encompass: bisphenols such as bisphenol A and bisphenol F; biphenyls such as dihydroxybiphenyl; polyhydric phenols such as hydroquinone and phenol-formaldehyde condensate; and naphthalenediol.

Examples of the polyether type polyols encompass: random copolymers and block copolymers obtained by ring-opening polymerization of ethylene oxide, propylene oxide, butylene oxide, styrene oxide, or the like in the presence of one or more active-hydrogen-containing initiators; and mixtures of these copolymers. Examples of the active-hydrogen-containing initiators used for the ring-opening polymerization to obtain the polyether type polyols encompass diols such as ethylene glycol, diethylene glycol, propylene glycol, dipropylene glycol, 1,3-butanediol, 1,4-butanediol, 1,6-hexanediol, neopentylglycol, and bisphenol A; triols such as trimethylolethane, trimethylolpropane, and glycerin; saccharides such as monosaccharides, oligosaccharides, and polysaccharides; sorbitol; and amines such as ammonia, ethylenediamine, urea, monomethyl diethanolamine, and monoethyl diethanolamine.

Examples of the polyester type polyols encompass polymers obtained by, in the presence of an esterification catalyst at a temperature falling within the range of 150° C. to 270° C., polycondensation of, for example, (a) a polybasic acid, such as maleic acid, fumaric acid, adipic acid, sebacic acid, phthalic acid, dodecanedioic acid, isophthalic acid, or azelaic acid, and/or an acid anhydride thereof and (b) a polyhydric alcohol such as ethylene glycol, propylene glycol, 1,4-butanediol, 1,6-hexanediol, diethylene glycol, dipropylene glycol, neopentylglycol, or 3-methyl-1,5-pentanediol. Examples of the polyester type polyols further encompass (a) polymers obtained by ring-opening polymerization of ε-caprolactone, valerolactone, or the like; and (b) active hydrogen compounds containing two or more active hydrogens, such as polycarbonate diol and castor oil.

Examples of the polyolefin type polyols encompass polybutadiene polyol, polyisoprene polyol, and hydrogenated versions thereof.

Examples of the acrylic polyols encompass: copolymers of, for example, (a) a hydroxyl-containing monomer such as hydroxyethyl (meth)acrylate, hydroxybutyl (meth)acrylate, or vinylphenol and (b) a general-purpose monomer such as n-butyl (meth)acrylate or 2-ethylhexyl (meth)acrylate; and mixtures thereof.

Out of these polyol resins, the polyether type polyols are preferred, because the resulting resin composition has a lower viscosity and has excellent workability, and the resin composition can provide the cured product which is well balanced between its hardness and toughness. Further, out of these polyol resins, the polyester type polyols are preferred, because the resulting resin composition can provide the cured product which has excellent adhesiveness.

(Amino-Formaldehyde Resins)

The amino-formaldehyde resins are not limited to any particular ones, provided that the amino-formaldehyde resins are each a compound obtained through a reaction between an amino compound and an aldehyde in the presence of an alkaline catalyst. Examples of the amino compound encompass: melamine; 6-substituted guanamines such as guanamine, acetoguanamine, and benzoguanamine; amine-substituted triazine compounds such as CTU guanamine (3,9-bis[2-(3,5-diamino-2,4,6-triazaphenyl)ethyl]-2,4,8,10-tetraoxaspiro[5,5]undecane) and CMTU guanamine (3,9-bis[(3,5-diamino-2,4,6-triazaphenyl)methyl]-2,4,8,10-tetraoxaspiro[5,5]undecane); and ureas such as urea, thiourea, and ethyleneurea. Examples of the amino compound also encompass: substituted melamine compounds which are different from melamine in that the hydrogen of an amino group is substituted by an alkyl group, an alkenyl group, and/or a phenyl group (described in Specification of U.S. Pat. No. 5,998,573 (a Japanese family member thereof: Japanese Patent Application Publication Tokukaihei No. 9-143238)); and substituted melamine compounds which are different from melamine in that the hydrogen of an amino group is substituted by a hydroxyalkyl group, a hydroxyalkyloxyalkyl group, and/or an aminoalkyl group (described in Specification of U.S. Pat. No. 5,322,915 (a Japanese family member thereof: Japanese Patent Application Publication Tokukaihei No. 5-202157)). Out of the above-listed compounds, melamine, guanamine, acetoguanamine and benzoguanamine, which are polyfunctional amino compounds, are preferable, and melamine is particularly preferable, as the amino compound, because they are industrially produced and inexpensive. The above-listed amino compounds may be used alone or in combination of two or more. In addition to these amino compounds, any of (a) phenols, such as phenol, cresol, alkylphenol, resorcin, hydroquinone, and/or pyrogallol, (b) anilines, and the like may be used.

Examples of the aldehyde encompass formaldehyde, paraformaldehyde, acetaldehyde, benzaldehyde, and furfural. Preferred aldehydes are formaldehyde and paraformaldehyde, because they are inexpensive and well react with the foregoing amino compound. In producing an aminoformaldehyde resin, it is preferable to use the aldehyde in the following amount: the amount of an effective aldehyde group in the aldehyde compound may be 1.1 mol to 6.0 mol, or 1.2 mol to 4.0 mol, per mole of the amino compound.
(Physical Properties of Thermosetting Resin)

The thermosetting resin is not particularly limited in terms of the properties thereof. The thermosetting resin may have a viscosity of 100 mPa·s to 1,000,000 mPa·s at 25° C. The viscosity of the thermosetting resin may be not more than 50,000 mPa·s, not more than 30,000 mPa·s, or not more than 15,000 mPa·s, at 25° C. According to the above feature, the thermosetting resin has an advantage of having excellent flowability. It can also be said that the thermosetting resin having a viscosity of 100 mPa·s to 1,000,000 mPa·s at 25° C. is a liquid.

As the flowability of the thermosetting resin becomes greater, in other words, as the viscosity of the thermosetting resin becomes lower, it becomes more difficult to disperse, in the thermosetting resin, the fine polymer particles (A) in the form of primary particles. Conventionally, it has been extremely difficult to disperse, in the thermosetting resin having a viscosity of not more than 1,000,000 mPa·s at 25° C., the fine polymer particles (A) in the form of the primary particles. However, the resin composition in accordance with one or more embodiments of the present invention has an advantage that the fine polymer particles (A) having the above feature are well dispersed in the thermosetting resin having a viscosity of not more than 1,000,000 mPa·s at 25° C.

Further, the viscosity of the thermosetting resin may be not less than 100 mPa·s, not less than 500 mPa·s, not less than 1000 mPa·s, or not less than 1500 mPa·s at 25° C., because such a viscosity allows the thermosetting resin to get between the fine polymer particles (A) and thereby allows prevention of fusion between the fine polymer particles (A).

The thermosetting resin may have a viscosity of more than 1,000,000 mPa·s. The thermosetting resin may be a semisolid (semiliquid) or may be alternatively a solid. In a case where the thermosetting resin has a viscosity of more than 1,000,000 mPa·s, the resulting resin composition has advantages that the resin composition is less sticky and easy to handle.

The thermosetting resin may have an endothermic peak at not higher than 25° C., or not higher than 0° C., in its differential scanning calorimetry (DSC) thermogram. According to the above feature, the thermosetting resin has an advantage of having excellent flowability.
(3-2. Blending Ratio Between the Present Resin Composition and Matrix Resins, Etc.)

The blending ratio between the present resin composition and the matrix resin is as follows. In a case where the total amount of the present resin composition and the matrix resin is regarded as 100% by weight, the amount of the present resin composition usually may be 0.5% by weight to 50% by weight and the amount of the matrix resin may be 50% by weight to 99.5% by weight, the amount of the present resin composition may be 1% by weight to 35% by weight and the amount of the matrix resin may be 65% by weight to 99% by weight, the amount of the present resin composition may be 1.5% by weight to 25% by weight and the amount of the matrix resin may be 75% by weight to 98.5% by weight, or the amount of the present resin composition may be 2.5% by weight to 20% by weight and the amount of the matrix resin may be 80% by weight to 97.5% by weight.

In a case where the matrix resin is the thermosetting resin, the state of the matrix resin is not limited to any particular one, provided that the matrix resin is flowable when mixed with the present resin composition. The matrix resin may be a solid at a room temperature. In terms of achieving workability, the matrix resin may be a liquid.

The temperature at which the present resin composition is mixed with such a thermosetting matrix resin is generally the temperature at which the thermosetting matrix resin can flow. However, in a case where the resin (B) can flow at the temperature at which the thermosetting matrix resin can flow, it is easy to uniformly mix the resin (B) and the thermosetting matrix resin. On the contrary, in a case where the thermosetting matrix resin is a liquid and an epoxy resin contained in the present resin composition to be added to the thermosetting matrix resin is a solid, it is difficult to uniformly mix the thermosetting matrix resin and the present resin composition. Note that, in the present specification, in a case where the thermosetting matrix resin is a liquid at 25° C., it is understood that "the viscosity of the thermosetting matrix resin at 25° C. is equal to or higher than the viscosity of the resin (B) at 25° C.".
(3-3. Other Components)

In terms of achieving an anti-blocking property and improving the dispersibility in the thermosetting matrix resin, a mixture of the present resin composition and the matrix resin may further contain an anti-blocking agent. The anti-blocking agent is not limited to any particular one, provided that the anti-blocking agent brings about the foregoing effects. Examples of the anti-blocking agent encompass: anti-blocking agents composed of inorganic fine particles, such as fine particles of silicon dioxide, titanium oxide, aluminum oxide, zirconium oxide, aluminum silicate, diatomaceous earth, zeolite, kaolin, talc, calcium carbonate, calcium phosphate, barium sulfate, and magnesium hydrosilicate; anti-blocking agents composed of organic fine particles; and fat-based and/or oil-based anti-blocking agents such as polyethylene wax, higher fatty acid amides, metal soap, and silicone oil. Out of these anti-blocking agents, anti-blocking agents composed of fine particles are preferable, and anti-blocking agents composed of organic fine particles are more preferable. As the anti-blocking agent, anti-blocking agents composed of organic fine particles of a polymer containing, as one or more constitutional units, one or more constitutional units derived from at least one type of monomer selected from the group consisting of aromatic vinyl monomers, vinyl cyanide monomers, and (meth)acrylate monomers are particularly preferable.

An anti-blocking agent composed of fine particles, in general, is in the form of a dispersion composed of the fine particles and a medium in which the fine particles are dispersed or is in the form of a colloid. The fine particles in the anti-blocking agent have a volume-average particle size (Mv) of usually not more than 10 μm, or 0.05 μm to 10 μm. The amount of the anti-blocking agent may be contained 0.01% by weight to 5.0% by weight, 0.5% by weight to 3.0% by weight, with respect to the total weight of the present resin composition and the matrix resin.

The mixture of the present resin composition and the matrix resin may contain, as necessary, any other component which is different from the above-described components. Examples of the any other component encompass: curing agents; coloring agents such as pigments and colorants; extenders; ultraviolet ray absorbing agents; antioxidants; heat stabilizers (antigelling agents); plasticizing agents; leveling agents; defoaming agents; silane coupling agents; antistatic agents; flame retardants; lubricants; viscosity reducers; shrinkage reducing agents; inorganic filler; organic filler; thermoplastic resins; desiccants; and dispersion agents.

The anti-blocking agent and one or more additives (any other component) can be added, as appropriate, during any step of a method of producing the present resin composition. For example, the anti-blocking agent and one or more additives can be added to an aqueous suspension before or after flocculation of the fine polymer particles (A). Alternatively, the anti-blocking agent and one or more additives can be added to the present resin composition or the mixture of the present resin composition and the matrix resin.

The mixture of the present resin composition and the matrix resin may further contain a known thermosetting resin other than the matrix resin, and may further contain a known thermoplastic resin.

[4. Cured Product]

A cured product in accordance with one or more embodiments of the present invention is obtained by curing the resin composition described in the section [3. Resin composition (mixture of the present resin composition and matrix resin)]. The cured product is also simply referred to as a present cured product.

The present cured product has the above-described feature. Therefore, even in a case where the resin composition is applied to a metal plate or the like and is then cured, rust is less likely to form. Moreover, the cured product has (a) an excellent surface appearance, (b) high rigidity and a high elastic modulus, and (c) excellent toughness and excellent adhesiveness.

[5. Other Uses]

The above-describe resin composition and the above-described mixture of the present resin composition and the matrix resin (hereinafter simply referred to as the present resin composition etc.) can be used in various applications, and the applications are not limited to any particular ones. The present resin composition etc. are each preferably used in applications such as, for example, adhesive agents, coating materials, binders for reinforcement fibers, composite materials, molding materials for 3D printers, sealants, electronic substrates, ink binders, wood chip binders, binders for rubber chips, foam chip binders, binders for castings, rock mass consolidation materials for floor materials and ceramics, and urethane foams. Examples of the urethane foams encompass automotive seats, automotive interior parts, sound absorbing materials, damping materials, shock absorbers (shock absorbing materials), heat insulating materials, and floor material cushions for construction.

The present resin composition etc. may be used for, out of the above applications, adhesive agents, coating materials, binders for reinforcement fibers, composite materials, molding materials for 3D printers, sealants, and electronic substrates.

(5-1. Adhesive Agent)

An adhesive agent in accordance with one or more embodiments of the present invention contains the above-described present resin composition etc. The adhesive agent in accordance with one or more embodiments of the present invention has the above feature, and therefore has excellent adhesiveness.

The adhesive agent in accordance with one or more embodiments of the present invention is also simply referred to as a present adhesive agent.

The present adhesive agent can be suitably used in various applications such as automotive interior materials, general woodworking, furniture, interior decoration, wall materials, and food packaging.

The present adhesive agent exhibits favorable adhesiveness to various adherends such as cold-rolled steel, aluminum, fiberglass-reinforced polyester (FRP), panels made of cured products obtained by curing thermosetting resins (for example, epoxy resin) reinforced with carbon fibers, panels made of thermoplastic resin sheets reinforced with carbon fibers, sheet molding compounds (SMC), an acrylonitrile-butadiene-styrene copolymer (ABS), polyvinyl chloride (PVC), polycarbonate, polypropylene, TPO, wood, and glass.

The present adhesive agent has excellent adhesiveness and excellent plasticity not only at low temperatures (approximately −20° C.) to ordinary temperatures but also at high temperatures (approximately 80° C.). Therefore, the present adhesive agent can be more suitably used as an adhesive agent for structures.

The adhesive agent for structures which employs the present adhesive agent can be used as an adhesive agent for, for example, structural members in the fields of automobiles, vehicles (for example, shinkansen (bullet trains) and trains), civil engineering, construction, building materials, woodworking, electricity, electronics, aircrafts, space industry, and the like. Specific examples of automobile-related applications encompass: bonding of interior materials such as ceilings, doors, and seats; bonding of automotive luminaires such as lamps; and bonding of exterior materials such as body side molding.

The present adhesive agent can be produced from the present resin composition etc. A method of producing the present adhesive agent is not limited to any particular one, and a known method can be employed.

(5-2. Coating Material)

A coating material in accordance with one or more embodiments of the present invention contains the above-described present resin composition etc. The coating material in accordance with one or more embodiments of the present invention has the above feature, and therefore can provide a coating film having an excellent load bearing property and excellent wear resistance.

The coating material in accordance with one or more embodiments of the present invention is also simply referred to as a present coating material.

In a case where the present coating material is applied to, for example, a floor or a corridor, a generally used application method can be employed. For example, after a primer is applied to a base material which has been subjected to surface preparation, the primer is uniformly coated with the present coating material with use of a trowel, a roller, a rake, a spray gun, and/or the like depending on conditions under which the primer is coated with the present coating material. After the primer is coated with the present coating material, curing of the present coating material proceeds, so that a good-performance coating is obtained. The coating film obtained by curing the present coating material can be a coating film having excellent load bearing and excellent wear resistance.

Depending on a method of applying the present coating material, the viscosity of the resin composition used for the coating material may be adjusted. For example, in a case where a trowel or a rake is used to apply the present coating material, the viscosity of the resin composition used for the present coating material can be adjusted to, generally, approximately 500 cps/25° C. to 9,000 cps/25° C. In a case where a roller or a spray is used to apply the present coating material, the viscosity of the resin composition used for the present coating material can be adjusted to, generally, approximately 100 cps/25° C. to 3,000 cps/25° C.

The base material (in other words, the material of the floor or the corridor) to which the present coating material is applied is not limited to any particular one. Specific examples of the base material encompass: (a) inorganic base materials such as concrete walls, concrete plates, concrete blocks, concrete masonry unit (CMU), mortar plates, autoclaved light-weight concrete (ALC) plates, gypsum boards (such as Dens Glass Gold manufactured by Georgia Pacific), and slate boards; (b) organic base materials such as wood-based base materials (such as wood, plywood, and oriented strand board (OSB)), asphalt, waterproof sheets made of modified bitumen, waterproof sheets made of ethylene-propylene-diene rubber (EPDM), waterproof sheets made of TPO, plastics, FRP, and urethane foam heat insulating materials; and (c) metal-based base materials such as metal panels.

A case will be described where the present coating material is applied to a metal base material or a porous base material. A laminate, obtained by applying and then curing the present coating material, is excellent in resistance of such a base material to corrosion. Furthermore, a coating film, obtained by applying and then curing the present coating material, can impart excellent crack resistance and excellent load bearing to the base material. Therefore, a mode in which the present coating material is applied to a metal base or a porous base material is a particularly preferable mode.

A method of applying the present coating material is not limited to any particular one, and the present coating material can be applied by a known method such as a trowel, a rake, a brush, a roller, an air spray, and/or an airless spray.

The present coating material is not particularly limited in terms of applications. For example, the present coating material can be used for automobiles, electric apparatuses, office equipment, construction materials, wood, coated floors, paving, heavy-duty anticorrosion, anticorrosion of concrete, waterproofing of rooftops and roofs, anticorrosion of rooftops and roofs, waterproof coating films for underground waterproofing, automotive refinishing, can coating, topcoat, intercoat, undercoat, primer, electro-deposition paint, highly weather resistant paint, non-yellowing paint, and the like. In a case where the present coating material is used for a coating material for coated floors, a coating material for paving, and the like, the present coating material can be used in factories, laboratories, warehouses, clean rooms, and the like.

The present coating material can be produced with use of the present resin composition etc. A method of producing the present coating material is not limited to any particular one, and a known method can be employed.

(5-3. Composite Material)

A composite material in accordance with one or more embodiments of the present invention contains, as a binder for reinforcement fibers, the above-described present resin composition etc. The composite material in accordance with one or more embodiments of the present invention has the above feature, and therefore has an advantage of having excellent toughness and excellent impact resistance.

The composite material in accordance with one or more embodiments of the present invention is also simply referred to as a present composite material.

The present composite material can contain reinforcement fibers. The reinforcement fibers are not limited to any particular ones. Example of the reinforcement fibers encompass glass fibers, continuous glass fibers, carbon fibers, natural fibers, metal fibers, thermoplastic resin fibers, boron fibers, aramid fibers, polyethylene fibers, and xyron-reinforced fibers. Out of these reinforcement fibers, glass fibers and carbon fibers are particularly preferable.

A method of producing the present composite material (molding method) is not limited to any particular one. Examples of the method encompass: an autoclave molding method in which a prepreg is used; a filament winding molding method; a hand lay-up molding method; a vacuum bag molding method; a resin transfer molding (RTM) method; a vacuum-assisted resin transfer molding (VARTM) method; a pultrusion molding method; an injection molding method, a sheet winding molding method; a spray up molding method; a bulk molding compound (BMC) method; and a sheet molding compound (SMC) method.

In particular, in a case where carbon fibers are used as the reinforcement fibers, an autoclave molding method in which a prepreg is used; a filament winding molding method; a hand lay-up molding method; a vacuum bag molding method; a resin transfer molding (RTM) method; a vacuum-assisted resin transfer molding (VARTM) method; or the like may be employed as the method of producing the present composite material.

The present composite material is not particularly limited in terms of applications. For example, the present composite material can be used for aircrafts, spacecrafts, automobiles, bicycles, watercrafts, weapons, wind turbines, sports goods, containers, building materials, waterproof materials, printed circuit boards, electrically insulating materials, and the like.

The present composite material can be produced with use of the present resin composition etc. In regard to further details of the reinforcement fibers, the production method (molding method), producing conditions (molding conditions), agents blended, applications, and the like concerning the present composite material, any of those disclosed in the following documents can be employed: United States Patent Application Publication No. 2006/0173128, United States Patent Application Publication No. 2012/0245286, Published Japanese Translation of PCT International Application, Tokuhyo, No. 2002-530445 (PCT International Application WO2000/029459), Japanese Patent Application Publication, Tokukaisho, No. 55-157620 (U.S. Pat. No. 4,251,428), Published Japanese Translation of PCT International Application, Tokuhyo, No. 2013-504007 (PCT International Application WO2011/028271), Japanese Patent Application Publication, Tokukai, No. 2007-125889 (United States Patent Application Publication No. 2007/0098997), and Japanese Patent Application Publication, Tokukai, No. 2003-220661 (United States Patent Application Publication No. 2003/0134085).

(5-4. Molding Material for 3D Printer)

A molding material for 3D printers in accordance with one or more embodiments of the present invention contains the above-described present resin composition etc. The molding material for 3D printers in accordance with one or more embodiments of the present invention has the above feature, and therefore has an advantage of having excellent toughness and excellent impact resistance.

The molding material for 3D printers in accordance with one or more embodiments of the present invention is also simply referred to as a present molding material.

The present molding material is not particularly limited in terms of applications. The present molding material can be used for goods made as samples for testing design, functions, and the like before actual products are made; aircraft parts; construction members; and parts of medical equipment.

The present molding material can be produced with use of the present resin composition etc. A method of producing the present molding material is not limited to any particular one, and a known method can be employed.

(5-5. Sealant)

A sealant in accordance with one or more embodiments of the present invention is obtained with use of the above-described present resin composition etc. The sealant in accordance with one or more embodiments of the present invention has the above feature, and therefore has an advantage of having excellent toughness and excellent impact resistance.

The sealant in accordance with one or more embodiments of the present invention is also simply referred to as a present sealant.

The present sealant is not particularly limited in terms of applications. For example, the present sealant can be used for sealing of various electric apparatuses (such as semiconductors), power devices, and the like.

The present sealant can be produced with use of the present resin composition etc. A method of producing the present sealant is not limited to any particular one, and a known method can be employed.

(5-6. Electronic Substrate)

An electronic substrate in accordance with one or more embodiments of the present invention is obtained with use of the above-described present resin composition etc. The electronic substrate in accordance with one or more embodiments of the present invention has the above feature, and therefore has an advantage of having excellent toughness and excellent impact resistance.

The electronic substrate in accordance with one or more embodiments of the present invention is also simply referred to as a present electronic substrate.

The present electronic substrate is not particularly limited in terms of applications. For example, the present electronic substrate can be used for printed circuits, printed wiring, printed circuit boards, products provided with printed circuits therein, printed wiring boards, and printed boards.

The present electronic substrate can be produced from the present resin composition etc. with use of the present resin composition etc. A method of producing the present electronic substrate is not limited to any particular one, and a known method can be employed.

SUMMARY

One or more embodiments of the present invention include the following.

(1) A method of producing a resin composition, including: a washing step of washing a resin composition with water, the resin composition containing: fine polymer particles (A) which have a graft part that is constituted by a polymer containing, as one or more structural units, one or more structural units derived from at least one type of monomer selected from the group consisting of aromatic vinyl monomers, vinyl cyanide monomers, and (meth)acrylate monomers; and a resin (B)

which is, at 25° C., a liquid having a viscosity of 100 mPa·s to 1,000,000 mPa·s, a semisolid, or a solid, in a case where a total amount of the fine polymer particles (A) and the resin (B) is regarded as 100% by weight, an amount of the fine polymer particles (A) being 1% by weight to 70% by weight and an amount of the resin (B) being 30% by weight to 99% by weight.

(2) The method as described in (2), further including an agglutinating step of obtaining, from a latex, the resin composition as an agglutinate which contains the fine polymer particles (A) and the resin (B), by at least one type of method selected from the group consisting of flocculation with use of a flocculant, shearing, and freezing.

(3) The method as described in (2), wherein the agglutinating step includes: a first agglutinating step of obtaining, from the latex which contains the fine polymer particles (A), the agglutinate which contains the fine polymer particles (A); an intermediate washing step of washing, with water, the agglutinate which has been obtained in the first agglutinating step; and a second agglutinating step of obtaining the agglutinate which contains the fine polymer particles (A) and the resin (B), by mixing the resin (B) and the agglutinate which has been subjected to the intermediate washing step.

(4) The method as described in any of (1) through (3), wherein the washing step includes a step of washing the resin composition with the water by kneading with use of a kneader or by stirring with use of a stirrer.

(5) The method as described in any of (1) through (4), wherein the intermediate washing step includes a step of washing the agglutinate which has been obtained in the first agglutinating step, with the water which has a temperature lower than a glass transition temperature of the fine polymer particles (A).

(6) The method as described in any of (1) through (5), wherein a temperature of the water in the washing step is not higher than 60° C.

(7) A resin composition containing: fine polymer particles (A) which have a graft part that is constituted by a polymer containing, as one or more structural units, one or more structural units derived from at least one type of monomer selected from the group consisting of aromatic vinyl monomers, vinyl cyanide monomers, and (meth)acrylate monomers; and a resin (B) which is, at 25° C., a liquid having a viscosity of 100 mPa·s to 1,000,000 mPa·s, a semisolid, or a solid, in a case where a total amount of the fine polymer particles (A) and the resin (B) is regarded as 100% by weight, an amount of the fine polymer particles (A) being 30% by weight to 70% by weight and an amount of the resin (B) being 30% by weight to 70% by weight.

(8) The resin composition as described in (7), wherein sulfur (S) or phosphorus (P) contained in the resin composition is removed by not less than 10% by single washing.

(9) The resin composition as described in (7) or (8), wherein in a case where the resin composition is placed on an 8-mesh metal gauze at 25° C. for 10 minutes, the resin composition does not pass through the 8-mesh metal gauze.

(10) The resin composition as described in any of (7) through (9), wherein the fine polymer particles (A) are constituted by a rubber-containing graft copolymer which has an elastic body and the graft part grafted to the elastic body.

(11) The resin composition as described in (10), wherein the elastic body includes at least one type of elastic body selected from the group consisting of diene-based rubbers, (meth)acrylate-based rubbers, and polysiloxane rubber-based elastic bodies.

(12) The resin composition as described in any of (7) through (11), wherein the resin (B) includes a thermosetting resin.

EXAMPLES

The following description will discuss one or more embodiments of the present invention in detail with reference to Examples and Comparative Examples. Note that one or more embodiments of the present invention are not limited to these examples. One or more embodiments of the present invention can be altered as appropriate within the scope of the gist disclosed herein. One or more embodiments of the present invention also include, in their technical scopes, embodiments achieved by altering one or more embodiments. Note that in the following Examples and Comparative Examples, "parts" means "parts by weight", and "%" means "% by weight"

[Evaluation Method]

First, the following description will discuss methods of evaluating resin compositions produced in Examples and Comparative Examples.

<Measurement of Volume-Average Particle Size>

The volume-average particle size (Mv) of an elastic body or fine polymer particles (A) dispersed in an aqueous latex was measured with use of Nanotrac WaveII-EX150 (manufactured by MicrotracBEL Corp.). A test specimen used for measurement was prepared by diluting the aqueous latex in deionized water. When the measurement was made, the refractive index of water and the refractive index of the elastic body or the fine polymer particles (A) obtained in each of Production Examples were inputted, measurement time was set to 120 seconds, and the concentration of the test specimen was adjusted such that a load index fell within the range of 1 to 20.

<Differential Scanning Calorimetry (DSC) of Resin (B)>

The differential scanning calorie of a liquid epoxy resin (JER828, manufactured by Mitsubishi Chemical Corporation), which was a resin (B) used in each of Examples and Comparative Examples below, was measured with use of DSC7020 (manufactured by Hitachi High-Tech Science Corporation). A rate of temperature rise was set to 10° C./min. As a result, the liquid epoxy resin was found to have an endothermic peak at −15° C.

<Measurement of Viscosity>

The viscosity of the liquid epoxy resin (JER828, manufactured by Mitsubishi Chemical Corporation), which was the resin (B) used in each of Examples and Comparative Examples below, or the viscosity of a resin composition obtained in each of Examples and Comparative Examples below was measured. A device used was a digital viscometer DV-II+Pro manufactured by BROOKFIELD FIELD. Further, a spindle CPE-52 was used for some viscosity ranges. The viscosity was measured at a temperature of 25° C., while a shear rate was changed as necessary. As a result, the viscosity of the liquid epoxy resin was 12,000 mPa·s.

<Measurement of Solvent Content of Resin Composition>

The solvent content of the obtained resin composition was measured with use of gas chromatography (GC-2014, manufactured by Shimadzu Corporation).

<Measurement of Amounts of S and P Remaining in Resin Composition

The amounts of S and P remaining in the resin composition were measured. Specifically, the amounts of S and P remaining in the resin composition were measured with use of an X-ray fluorescence analyzer SPECTRO XEPOS (manufactured by SPECTRO). Note that in a case where sodium dodecylbenzenesulfonate (DBS) was used as an emulsifying agent, only the amount of S remaining in the resin composition was measured. In a case where sodium polyoxyethylene lauryl ether phosphate was used as an emulsifying agent, only the amount of P remaining in the resin composition was measured.

1. Formation of Elastic Body by Polymerization

Production Example 1-1: Preparation of Polybutadiene Rubber Latex (R-1)

Into a pressure-resistant polymerization apparatus were introduced 200 parts of deionized water, 0.03 parts of tripotassium phosphate, 0.002 parts of disodium ethylene-diaminetetraacetate (EDTA), 0.001 parts of ferrous sulfate heptahydrate, and 1.55 parts of sodium dodecylbenzene-sulfonate (SDBS), which was an emulsifying agent. Next, while the materials thus introduced were stirred, gas in the pressure-resistant polymerization apparatus was replaced with nitrogen, so as to sufficiently remove oxygen from the inside of the pressure-resistant polymerization apparatus. Thereafter, 100 parts of butadiene (Bd) was introduced into the pressure-resistant polymerization apparatus, and the temperature inside the pressure-resistant polymerization apparatus was raised to 45° C. Subsequently, 0.03 parts of paramenthane hydroperoxide (PHP) was introduced into the pressure-resistant polymerization apparatus, and then 0.10 parts of sodium formaldehyde sulfoxylate (SFS) was introduced into the pressure-resistant polymerization apparatus. Polymerization was then started. At the time 15 hours had elapsed from the start of the polymerization, devolatilization was carried out under reduced pressure to remove a remaining monomer that had not been used in the polymerization, so as to end the polymerization. During the polymerization, PHP, EDTA, and ferrous sulfate heptahydrate were each added to the pressure-resistant polymerization apparatus in discretionarily selected amounts and discretionarily selected points in time. By the polymerization, an aqueous latex (R-1), which contained an elastic body containing polybutadiene rubber as a main component, was obtained. The volume-average particle size of the elastic body contained in the obtained aqueous latex was 90 nm.

Production Example 1-2: Preparation of Polybutadiene Rubber Latex (R-2)

Into a pressure-resistant polymerization apparatus were introduced 7 parts of a solid content of the polybutadiene rubber latex (R-1) obtained in Production Example 1-1, 200 parts of deionized water, 0.03 parts of tripotassium phosphate, 0.002 parts of EDTA, and 0.001 parts of ferrous sulfate heptahydrate. Next, while the materials thus introduced were stirred, gas in the pressure-resistant polymerization apparatus was replaced with nitrogen, so as to sufficiently remove oxygen from the inside of the pressure-resistant polymerization apparatus. Thereafter, 93 parts of Bd was introduced into the pressure-resistant polymerization apparatus, and the temperature inside the pressure-resistant polymerization apparatus was raised to 45° C. Thereafter, 0.02 parts of PHP was introduced into the pressure-resistant polymerization apparatus, and then 0.10 parts of SFS was introduced into the pressure-resistant polymerization apparatus. Polymerization was then started. At the time 30 hours had elapsed from the start of the polymerization, devolatilization was carried out under reduced pressure to remove a remaining monomer that had not been used in the polymerization, so as to end the polymerization. During the polymerization, PHP, EDTA, ferrous sulfate heptahydrate, and SDBS were each added to the pressure-resistant polymerization apparatus in discretionarily selected amounts and discretionarily selected points in time. By the polymerization, an aqueous latex (R-2), which contained an elastic body containing polybutadiene rubber as a main component, was obtained. The volume-average particle size of the elastic body contained in the obtained aqueous latex was 195 nm.

Production Example 1-3: Preparation of Polystyrene-Butadiene Rubber Latex (R-3)

Into a pressure-resistant polymerization apparatus were introduced 160 parts of deionized water, 0.002 parts of EDTA, 0.001 parts of ferrous sulfate heptahydrate, 0.029 parts of polyoxyethylene lauryl ether phosphate, and 0.003 parts of sodium hydroxide. In so doing, the polyoxyethylene lauryl ether phosphate turned into sodium polyoxyethylene lauryl ether phosphate in the presence of the sodium hydroxide, and functioned as an emulsifying agent. Next, while the materials thus introduced were stirred, gas in the pressure-resistant polymerization apparatus was replaced with nitrogen, so as to sufficiently remove oxygen from the inside of the pressure-resistant polymerization apparatus. Thereafter, 76.5 parts of Bd and 23.5 parts of styrene (St) were introduced into the pressure-resistant polymerization apparatus, and the temperature inside the pressure-resistant polymerization apparatus was raised to 45° C. Thereafter, 0.03 parts of PHP was introduced into the pressure-resistant polymerization apparatus, and then 0.05 parts of SFS was introduced into the pressure-resistant polymerization apparatus. Polymerization was then started. At the time 20 hours had elapsed from the start of the polymerization, devolatilization was carried out under reduced pressure to remove a remaining monomer that had not been used in the polymerization, so as to end the polymerization. During the polymerization, PHP, polyoxyethylene lauryl ether phosphate, and sodium hydroxide were each added to the pressure-resistant polymerization apparatus in discretionarily selected amounts and discretionarily selected points in time. By the polymerization, an aqueous latex (R-3), which contained an elastic body containing polystyrene-butadiene rubber as a main component, was obtained. The volume-average particle size of the elastic body contained in the obtained aqueous latex was 192 nm.

Production Example 1-4: Preparation of Polybutadiene Rubber Latex (R-4)

Into a pressure-resistant polymerization apparatus were introduced 200 parts by weight of deionized water, 0.03 parts by weight of tripotassium phosphate, 0.002 parts by weight of disodium ethylenediaminetetraacetate (EDTA), 0.001 parts by weight of ferrous sulfate heptahydrate, and 1.55 parts by weight of sodium dodecylbenzenesulfonate (SDBS), which was an emulsifying agent. Next, while the materials thus introduced were stirred, gas in the pressure-resistant polymerization apparatus was replaced with nitrogen, so as to sufficiently remove oxygen from the inside of the pressure-resistant polymerization apparatus. Thereafter, 100 parts by weight of butadiene (Bd) was introduced into the pressure-resistant polymerization apparatus, and the temperature inside the pressure-resistant polymerization apparatus was raised to 45° C. Subsequently, 0.03 parts by weight of paramenthane hydroperoxide (PHP) was introduced into the pressure-resistant polymerization apparatus, and then 0.10 parts by weight of sodium formaldehyde sulfoxylate (SFS) was introduced into the pressure-resistant polymerization apparatus. Polymerization was then started. At the time 15 hours had elapsed from the start of the polymerization, devolatilization was carried out under reduced pressure to remove a remaining monomer that had not been used in the polymerization, so as to end the polymerization. During the polymerization, PHP, EDTA, and ferrous sulfate heptahydrate were each added to the pressure-resistant polymerization apparatus in discretionarily selected amounts and discretionarily selected points in time. By the polymerization, an aqueous latex (R-4), which contained an elastic body containing polybutadiene rubber as a main component, was obtained. The volume-average particle size of the elastic body contained in the obtained aqueous latex was 70 nm.

2. Preparation of Fine Polymer Particles (A) (Formation of Graft Part by Polymerization)

Production Example 2-1; Preparation of Fine Polymer Particle Latex (L-1)

Into a glass reaction vessel were introduced 250 parts of the polybutadiene rubber latex (R-2) (including 87 parts of the elastic body containing polybutadiene rubber as a main component) and 50 parts of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.004 parts of EDTA, 0.001 parts of ferrous sulfate heptahydrate, and 0.2 parts of SFS were added to the glass reaction vessel, and a resulting mixture was stirred for 10 minutes. Thereafter, a mixture of 12.5 parts of methyl methacrylate (MMA), 0.5 parts of St, and 0.035 parts of t-butyl hydroperoxide (BHP) was added continuously to the glass reaction vessel over 80 minutes. Subsequently, 0.013 parts of BHP was added to the glass reaction vessel, and a resulting mixture in the glass reaction vessel was stirred for 1 hour so as to finish polymerization. Through the above operations was obtained an aqueous latex (L-1) containing fine polymer particles (A) and an emulsifying agent. 99% or more of the monomer component had been polymerized. The volume-average particle size of the fine polymer particles (A) contained in the obtained aqueous latex was 200 nm. The solid content concentration (concentration of the fine polymer particles (A)) of the obtained aqueous latex (L-1) was 30%.

Production Example 2-2; Preparation of Fine Polymer Particle Latex (L-2)

Into a glass reaction vessel were introduced 250 parts of the polystyrene-butadiene rubber latex (R-3) (including 87 parts of the elastic body containing polystyrene-butadiene rubber as a main component) and 50 parts of deionized water. The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.004 parts of EDTA, 0.001 parts of ferrous sulfate heptahydrate, and 0.2 parts of SFS were added to the glass reaction vessel, and a resulting mixture was stirred for 10 minutes. Thereafter, a mixture of 12.5 parts of MMA, 0.5 parts of St, and 0.035 parts of BHP was added continuously to the glass reaction vessel over 80 minutes. Subsequently, 0.013 parts of BHP was added to the glass reaction vessel, and a resulting mixture in the glass reaction vessel was stirred for 1 hour so as to finish polymerization. Through the above operations was obtained an aqueous latex (L-2) containing fine polymer particles (A) and an emulsifying agent. 99% or more of the monomer component had been polymerized. The volume-average particle size of the fine polymer particles (A) contained in the obtained aqueous latex was 200 nm. The solid content concentration (concentration of the fine polymer particles (A)) of the obtained aqueous latex (L-2) was 30%.

Production Example 2-3; Preparation of Fine Polymer Particle Latex (L-3)

Into a glass reaction vessel was introduced 250 parts by weight of the polybutadiene rubber latex (R-4) (including 83 parts by weight of the elastic body containing polybutadiene rubber as a main component). The glass reaction vessel had a thermometer, a stirrer, a reflux condenser, a nitrogen inlet, and a monomer adding device. Gas in the glass reaction vessel was replaced with nitrogen, and the materials thus introduced were stirred at 60° C. Next, 0.004 parts by weight of EDTA, 0.001 parts by weight of ferrous sulfate heptahy-drate, and 0.20 parts by weight of SFS were added to the glass reaction vessel, and a resulting mixture was stirred for 10 minutes. Thereafter, a mixture of 0.8 parts by weight of methyl methacrylate (MMA), 5.4 parts by weight of styrene (St), 3.9 parts by weight of acrylonitrile (AN), 6.9 parts by weight of glycidyl methacrylate (GMA), and 0.043 parts by weight of t-butyl hydroperoxide (BHP) was added continu-ously to the glass reaction vessel over 120 minutes. Subse-quently, 0.013 parts by weight of BHP was added to the glass reaction vessel, and a resulting mixture in the glass reaction vessel was stirred for 1 hour so as to finish polymerization. Through the above operations was obtained an aqueous latex (L-3) containing fine polymer particles (A). 99% or more of the monomer component had been polymerized. The vol-ume-average particle size of the fine polymer particles (A) contained in the obtained aqueous latex was 80 nm. The solid content concentration (concentration of the fine poly-mer particles (A)) of the obtained aqueous latex (L-3) was 30%.

Example 1

To 333 g of the aqueous latex (L-1), 20 g of 24% sodium sulfate was added. These materials were mixed with use of a spatula, so that a latex which contained an agglutinate that contained the fine polymer particles (A) was obtained. The latex was then separated into the agglutinate and a water component. Subsequently, (a1) the agglutinate thus obtained and 500 g of ion exchanged water were mixed, and a resulting mixture was stirred at 30° C. for 30 minutes. Then, (a2) the mixture thus obtained was subjected to filtration under reduced pressure so that rinse water was removed from the mixture. The above operations (a1) and (a2) were repeated another two times (three times in total), and the agglutinate was obtained. The agglutinate thus obtained and 150 g of a liquid epoxy resin (JER828, manufactured by Mitsubishi Chemical Corporation, the same was used below) which was a resin (B) were introduced and kneaded with use of a continuous type kneader. As a result, a resin composition which was the agglutinate that contained the fine polymer particles (A) and the resin (B) was obtained. Subsequently, (b1) the resin composition (agglutinate) thus obtained and 375 g of ion exchanged water were mixed, and a resulting mixture was stirred at 90° C. for 30 minutes. Then, (b2) the mixture thus obtained was subjected to oil-water separation, rinse water was removed from the mixture, and the resin composition was taken out. The above operations (b1) and (b2) were repeated another two times (three times in total), and the washed resin composition was obtained. The resin composition thus obtained was subjected to vacuum devolatilization at 115° C. so that water was removed. The amount of S remaining in the resin compo-sition thus obtained was measured, and was found to be 50 ppm. Note that the weight ratio between the fine polymer particles (A) and the resin (B) was 40:60, and the resin composition was in dough form.

Comparative Example 1

To 333 g of the aqueous latex (L-1), 20 g of 24% sodium sulfate was added. These materials were mixed with use of a spatula, so that a latex which contained an agglutinate that contained the fine polymer particles (A) was obtained. The latex was then separated into the agglutinate and a water component. Subsequently, (1) the agglutinate thus obtained and 500 g of ion exchanged water were mixed, and a resulting mixture was stirred at 30° C. for 30 minutes. Then, (2) the mixture thus obtained was subjected to filtration under reduced pressure so that rinse water was removed from the mixture. The above operations (1) and (2) were repeated another five times (six times in total), and the agglutinate was obtained. The agglutinate thus obtained and 150 g of a liquid epoxy resin which was a resin (B) were introduced and kneaded with use of a continuous type kneader. As a result, a resin composition which was the agglutinate that contained the fine polymer particles (A) and the resin (B) was obtained. The resin composition thus obtained was subjected to vacuum devolatilization at 115° C. so that water was removed. The amount of S remaining in the resin composition thus obtained was measured, and was found to be 150 ppm. Note that the weight ratio between the fine polymer particles (A) and the resin (B) was 40:60, and the resin composition was in dough form.

Example 2

To 150 g of a liquid epoxy resin which was a resin (B), 20 g of 24% sodium sulfate was added. These materials were mixed with use of a spatula. To a resulting mixture, 333 g of the aqueous latex (L-1) was added. These materials were mixed with use of a spatula, so that a latex containing a resin composition which was an agglutinate that contained the fine polymer particles (A) and the resin (B) was obtained. The latex was then separated into the resin composition and a water component. Subsequently, 100 g of the resin com-position (agglutinate) thus obtained and 150 g of ion exchanged water were mixed, and a resulting mixture was stirred at 90° C. for 30 minutes. Then, the mixture thus obtained was subjected to oil-water separation, and the washed resin composition was taken out. The resin compo-sition thus obtained was subjected to vacuum devolatiliza-tion at 115° C. so that water was removed. The amount of S remaining in the resin composition thus obtained was mea-sured, and was found to be 375 ppm. Note that the weight ratio between the fine polymer particles (A) and the resin (B) was 40:60, and the resin composition was in dough form.

Example 3

To 300 g of a liquid epoxy resin which was a resin (B), 20 g of 24% sodium sulfate and 333 g of the aqueous latex (L-1) were added. These materials were mixed with use of a spatula, so that a latex containing a resin composition which was an agglutinate that contained the fine polymer particles (A) and the resin (B) was obtained. The latex was then separated into the resin composition and a water component. Subsequently, 100 g of the resin composition (agglutinate) thus obtained and 150 g of ion exchanged water were mixed, and a resulting mixture was stirred at 90° C. for 30 minutes. Then, the mixture thus obtained was subjected to oil-water separation, and the washed resin composition was taken out. The resin composition thus obtained was subjected to vacuum devolatilization at 115° C. so that water was removed. The amount of S remaining in the resin composition thus obtained was measured, and was found to be 563 ppm. Note that the weight ratio between the fine polymer particles (A) and the resin (B) was 25:75, and the resin composition was in liquid form.

Comparative Example 2

To 25 g of a liquid epoxy resin which was a resin (B), 20 g of 24% sodium sulfate was added. These materials were mixed with use of a spatula. To a resulting mixture, 333 g of the aqueous latex (L-1) was added. These materials were mixed with use of a spatula, so that a latex containing a resin composition which was an agglutinate that contained the fine polymer particles (A) and the resin (B) was obtained. The latex was then separated into the resin composition and a water component. Subsequently, 100 g of the resin composition (agglutinate) thus obtained and 150 g of ion exchanged water were mixed, and a resulting mixture was stirred at 90° C. for 30 minutes. Then, the mixture thus obtained was subjected to oil-water separation, and the washed resin composition was taken out. The resin composition thus obtained was subjected to vacuum devolatilization at 115° C. so that water was removed. The amount of S remaining in the resin composition thus obtained was measured, and was found to be 740 ppm. Note that the weight ratio between the fine polymer particles (A) and the resin (B) was 80:20, and the resin composition was in powdery and/or granular form.

Example 4

With use of a homomixer, 333 g of the aqueous latex (L-1) was stirred at 12000 rpm. Then, 150 g of a liquid epoxy resin which was a resin (B) was introduced into the homomixer. A resulting mixture was further stirred for 30 minutes. The mixture thus stirred was left to stand in a freezer at −20° C. for 12 hours so as to be frozen. In this manner, the frozen latex (L-1) was obtained. The frozen latex (L-1) was thawed by putting a vessel containing the frozen latex (L-1) in hot water at 50° C. The thawed latex (L-1) was separated into a resin composition and a water component, the resin composition being an agglutinate which contained the fine polymer particles (A) and the resin (B). Subsequently, 200 g of the resin composition (agglutinate) thus obtained and 300 g of ion exchanged water were mixed, and a resulting mixture was stirred at 90° C. for 30 minutes. Then, the mixture thus obtained was subjected to oil-water separation, and the washed resin composition was taken out. The resin composition thus obtained was subjected to vacuum devolatilization at 115° C. so that water was removed. The amount of S remaining in the resin composition thus obtained was measured, and was found to be 66 ppm. Note that the weight ratio between the fine polymer particles (A) and the resin (B) was 40:60, and the resin composition was in dough form.

Example 5

With use of a homomixer, 333 g of the aqueous latex (L-1) was stirred at 12000 rpm. Then, 66.7 g of a liquid epoxy resin which was a resin (B), was introduced into the homomixer. A resulting mixture was further stirred for 30 minutes. The mixture thus stirred was left to stand in a freezer at −20° C. for 12 hours so as to be frozen. In this manner, the frozen latex (L-1) was obtained. The frozen latex (L-1) was thawed by putting a vessel containing the frozen latex (L-1) in hot water at 50° C. The thawed latex (L-1) was separated into a resin composition and a water component, the resin composition being an agglutinate which contained the fine polymer particles (A) and the resin (B). Seven cycles of the operation of feeding, to a continuous type kneader, 100 g of the resin composition (agglutinate) thus obtained and 30 g of ion exchanged water and the operation of subjecting a resulting mixture to centrifugal dehydration were carried out in total. As a result, the washed resin composition was obtained. The resin composition thus obtained was subjected to vacuum devolatilization at 115° C. so that water was removed. The amount of S remaining in the resin composition thus obtained was measured, and was found to be 68 ppm. Note that the weight ratio between the fine polymer particles (A) and the resin (B) was 60:40, and the resin composition was in crumb form.

Example 6

With use of a high shear emulsifier, 333 g of the aqueous latex (L-1) was stirred at 6000 rpm. Then, 66.7 g of a liquid epoxy resin which was a resin (B) was introduced into the high shear emulsifier. A resulting mixture was further stirred for 90 minutes. The mixture (latex) thus obtained was separated into a resin composition and a water component, the resin composition being an agglutinate which contained the fine polymer particles (A) and the resin (B). Three cycles of the operation of feeding, to a continuous type kneader, 100 g of the resin composition (agglutinate) thus obtained and 60 g of ion exchanged water and the operation of subjecting a resulting mixture to centrifugal dehydration were carried out in total. As a result, the washed resin composition was obtained. The resin composition thus obtained was subjected to vacuum devolatilization at 115° C. so that water was removed. The amount of S remaining in the resin composition thus obtained was measured, and was found to be 60 ppm. Note that the weight ratio between the fine polymer particles (A) and the resin (B) was 60:40, and the resin composition was in crumb form.

Example 7

With use of a high shear emulsifier, 333 g of the aqueous latex (L-1) was stirred at 6000 rpm. Then, 150 g of a liquid epoxy resin which was a resin (B) was introduced into the high shear emulsifier. A resulting mixture was further stirred for 90 minutes. The mixture (latex) thus obtained was separated into a resin composition and a water component, the resin composition being an agglutinate which contained the fine polymer particles (A) and the resin (B). Three cycles of the operation of feeding, to a continuous type kneader, the resin composition (agglutinate) thus obtained and 100 g of ion exchanged water and the operation of subjecting a resulting mixture to centrifugal dehydration were carried out in total. As a result, the washed resin composition was obtained. The resin composition thus obtained was subjected to vacuum devolatilization at 115° C. so that water was removed. The amount of S remaining in the resin composition thus obtained was measured, and was found to be 41 ppm. Note that the weight ratio between the fine polymer particles (A) and the resin (B) was 40:60, and the resin composition was in dough form.

Example 8

To a metallic surface at −30° C., 333 g of the aqueous latex (L-2) was fed. The aqueous latex (L-2) was scraped 1 minute later. In this manner, the frozen latex (L-2) was obtained. The frozen latex (L-2) was thawed at an ordinary temperature. The thawed latex (L-2) and 66.7 g of a liquid epoxy resin which was a resin (B) were kneaded with use of a continuous type kneader. Next, the latex was separated into a resin composition and a water component, the resin composition being an agglutinate which contained the fine polymer particles (A) and the resin (B). Three cycles of the operation of feeding, to a continuous type kneader, 100 g of the resin composition (agglutinate) thus obtained and 60 g of ion exchanged water and the operation of subjecting a resulting mixture to centrifugal dehydration were carried out in total. As a result, the washed resin composition was obtained. The resin composition thus obtained was subjected to vacuum devolatilization at 115° C. so that water was removed. The amount of P remaining in the resin composition thus obtained was measured, and was found to be 58 ppm. Note that the weight ratio between the fine polymer particles (A) and the resin (B) was 60:40, and the resin composition was in crumb form.

Comparative Example 3

To a metallic surface at −30° C., 333 g of the aqueous latex (L-2) was fed. The aqueous latex (L-2) was scraped 1 minute later. In this manner, the frozen latex (L-2) was obtained. The frozen latex (L-2) was thawed at an ordinary temperature. The thawed latex (L-2) was separated into an agglutinate and a water component, the agglutinate containing the fine polymer particles (A). Three cycles of the operation of feeding, to a continuous type kneader, the agglutinate thus obtained and 100 g of ion exchanged water and the operation of subjecting a resulting mixture to centrifugal dehydration were carried out in total. As a result, the washed agglutinate was obtained. Subsequently, 100 g of the agglutinate thus obtained and 66.7 g of a liquid epoxy resin which was a resin (B) were kneaded with use of a continuous type kneader. Next, the latex was separated into a resin composition and a water component, the resin composition being the agglutinate which contained the fine polymer particles (A) and the resin (B). The resin composition (agglutinate) thus obtained was subjected to vacuum devolatilization at 115° C. so that water was removed. The amount of P remaining in the resin composition thus obtained was measured, and was found to be 120 ppm. The dispersibility of the resin composition thus obtained was evaluated.

Example 9

To 150 g of a liquid epoxy resin which was a resin (B), 20 g of 24% sodium sulfate was added. These materials were mixed with use of a spatula. To a resulting mixture, 333 g of the aqueous latex (L-3) was added. These materials were mixed with use of a spatula, so that a latex containing a resin composition which was an agglutinate that contained the fine polymer particles (A) and the resin (B) was obtained. The latex was then separated into the resin composition and a water component. Subsequently, 100 g of the resin composition (agglutinate) thus obtained and 150 g of ion exchanged water were mixed, and a resulting mixture was stirred at 50° C. for 30 minutes. Then, the mixture thus obtained was subjected to oil-water separation, and the washed resin composition was taken out. The viscosity at the temperature at which the resin composition was washed was 110000 mPa·s. After the above operation was carried out three times in total, the resin composition thus obtained was subjected to vacuum devolatilization at 115° C. so that water was removed. The amount of S remaining in the resin composition thus obtained was measured, and was found to be 504 ppm. Note that the weight ratio between the fine polymer particles (A) and the resin (B) was 40:60, and the resin composition was in dough form.

Example 10

To 178 g of a liquid epoxy resin which was a resin (B), 20 g of 24% sodium sulfate was added. These materials were mixed with use of a spatula. To a resulting mixture, 333 g of the aqueous latex (L-3) was added. These materials were mixed with use of a spatula, so that a latex containing a resin composition which was an agglutinate that contained the fine polymer particles (A) and the resin (B) was obtained. The latex was then separated into the resin composition and a water component. Subsequently, 100 g of the resin composition (agglutinate) thus obtained and 150 g of ion exchanged water were mixed, and a resulting mixture was stirred at 50° C. for 30 minutes. Then, the mixture thus obtained was subjected to oil-water separation, and the washed resin composition was taken out. After the above operation was carried out three times in total, the resin composition thus obtained was subjected to vacuum devolatilization at 115° C. so that water was removed. The amount of S remaining in the resin composition thus obtained was measured, and was found to be 720 ppm. Note that the weight ratio between the fine polymer particles (A) and the resin (B) was 36:64, and the resin composition was in dough form.

Example 11

To 150 g of a liquid epoxy resin which was a resin (B), 20 g of 24% sodium sulfate was added. These materials were mixed with use of a spatula. To a resulting mixture, 333 g of the aqueous latex (L-3) was added. These materials were mixed with use of a spatula, so that a latex containing a resin composition which was an agglutinate that contained the fine polymer particles (A) and the resin (B) was obtained. The latex was then separated into the resin composition and a water component. Subsequently, 100 g of the resin composition (agglutinate) thus obtained and 150 g of ion exchanged water were mixed, and a resulting mixture was stirred at 30° C. for 30 minutes. Then, the mixture thus obtained was subjected to oil-water separation, and the washed resin composition was taken out. After the above operation was carried out three times in total, the resin composition thus obtained was subjected to vacuum devolatilization at 115° C. so that water was removed. The amount of S remaining in the resin composition thus obtained was measured, and was found to be 126 ppm. Note that the weight ratio between the fine polymer particles (A) and the resin (B) was 40:60, and the resin composition was in dough form.

Comparative Example 4

To 25 g of a liquid epoxy resin which was a resin (B), 20 g of 24% sodium sulfate was added. These materials were mixed with use of a spatula. To a resulting mixture, 333 g of the aqueous latex (L-3) was added. These materials were mixed with use of a spatula, so that a latex containing a resin composition which was an agglutinate that contained the fine polymer particles (A) and the resin (B) was obtained. The latex was then separated into the resin composition and a water component. Subsequently, 100 g of the resin composition (agglutinate) thus obtained and 150 g of ion exchanged water were mixed, and a resulting mixture was stirred at 50° C. for 30 minutes. Then, the mixture thus obtained was subjected to oil-water separation, and the washed resin composition was taken out. After the above operation was carried out three times in total, the resin composition thus obtained was subjected to vacuum devolatilization at 115° C. so that water was removed. The amount of S remaining in the resin composition thus obtained was measured, and was found to be 1300 ppm. Note that the weight ratio between the fine polymer particles (A) and the resin (B) was 80:20, and the resin composition was in powdery and/or granular form.

Experiments were conducted as below, for a case where the temperature of water used in the washing step was low.

Example 12

To 150 g of a liquid epoxy resin which was a resin (B), 20 g of 24% sodium sulfate was added. These materials were mixed with use of a spatula. To a resulting mixture, 333 g of the aqueous latex (L-1) was added. These materials were mixed with use of a spatula, so that a latex containing a resin composition which was an agglutinate that contained the fine polymer particles (A) and the resin (B) was obtained. The latex was then separated into the resin composition and a water component. Subsequently, 100 g of the resin composition (agglutinate) thus obtained and 150 g of ion exchanged water were mixed, and a resulting mixture was stirred at 50° C. for 30 minutes. Then, the mixture thus obtained was subjected to oil-water separation, and the washed resin composition was taken out. The resin composition thus obtained was subjected to vacuum devolatilization at 115° C. so that water was removed. The amount of S remaining in the resin composition thus obtained was measured, and was found to be 103 ppm. Note that the weight ratio between the fine polymer particles (A) and the resin (B) was 40:60, and the resin composition was in dough form.

Example 13

To 150 g of a liquid epoxy resin which was a resin (B), 20 g of 24% sodium sulfate was added. These materials were mixed with use of a spatula. To a resulting mixture, 333 g of the aqueous latex (L-1) was added. These materials were mixed with use of a spatula, so that a latex containing a resin composition which was an agglutinate that contained the fine polymer particles (A) and the resin (B) was obtained. The latex was then separated into the resin composition and a water component. Subsequently, 100 g of the resin composition (agglutinate) thus obtained and 150 g of ion exchanged water were mixed, and a resulting mixture was stirred at 30° C. for 30 minutes. Then, the mixture thus obtained was subjected to oil-water separation, and the washed resin composition was taken out. The resin composition thus obtained was subjected to vacuum devolatilization at 115° C. so that water was removed. The amount of S remaining in the resin composition thus obtained was measured, and was found to be 53 ppm. Note that the weight ratio between the fine polymer particles (A) and the resin (B) was 40:60, and the resin composition was in dough form.

Table 1 below shows results.

TABLE 1

| | After washing S ppm | After washing P ppm | Form | Weight ratio fine polymer particles (A)/ resin (B) |
|---|---|---|---|---|
| Example 1 | 50 | — | Dough | 40/60 |
| Comparative Example 1 | 150 | — | Dough | 40/60 |
| Example 2 | 375 | — | Dough | 40/60 |
| Example 12 | 103 | — | Dough | 40/60 |
| Example 13 | 53 | — | Dough | 40/60 |
| Example 3 | 563 | — | Liquid | 25/75 |
| Comparative Example 2 | 740 | — | Powdery and/or granular | 80/20 |
| Example 4 | 66 | — | Dough | 40/60 |
| Example 5 | 68 | — | Crumb | 60/40 |
| Example 6 | 60 | — | Crumb | 60/40 |
| Example 7 | 41 | — | Dough | 40/60 |
| Example 8 | — | 58 | Crumb | 60/40 |
| Comparative Example 3 | — | 120 | Crumb | 60/40 |
| Example 9 | 504 | — | Dough | 40/60 |
| Example 10 | 720 | — | Dough | 36/64 |
| Example 11 | 126 | — | Dough | 40/60 |
| Comparative Example 4 | 1300 | — | Powdery and/or granular | 80/20 |

As shown in Table 1, it was found, from comparisons between Example 1 and Comparative Example 1, between Example 2 and Comparative Example 2, and between Example 8 and Comparative Example 3, that carrying out the washing step in accordance with one or more embodiments of the present invention could reduce impurities.

Further, the amount of S after each washing step and a rate of removal of S, which was based on the amount of S before and after each washing step, were calculated, while (i) in Example 2, mixing 100 g of the resin composition and 150 g of ion exchanged water at 90° C. for 30 minutes was regarded as singe washing and (ii) in Example 5, kneading 100 g of the resin composition and 30 g of ion exchanged water was regarded as single washing. Table 2 shows results.

TABLE 2

| Number of times of washing | Example 5 S [ppm] | Rate of removal | Example 2 S [ppm] | Rate of removal |
|---|---|---|---|---|
| 0 | 435 | — | 375 | — |
| 1 | 320 | 26% | 220 | 41% |
| 2 | 243 | 24% | 106 | 52% |
| 3 | 169 | 30% | 70 | 34% |
| 4 | 131 | 22% | | |
| 5 | 115 | 13% | | |
| 6 | 92 | 20% | | |
| 7 | 68 | 26% | | |

Example 14

The resin composition which contained (i) 40% by weight of the fine polymer particles (A) that was obtained from the aqueous latex (L-1) and (ii) 60% by weight of the liquid epoxy resin that was the resin (B) was in dough form. In a case where this resin composition was placed on an 8-mesh metal gauze at 25° C. for 10 minutes, 0% of the resin composition passed through the metal gauze.

Example 15

The resin composition which contained (i) 60% by weight of the fine polymer particles (A) that was obtained from the aqueous latex (L-1) and (ii) 40% by weight of the liquid epoxy resin that was the resin (B) was in crumb form. In a case where this resin composition was placed on an 8-mesh metal gauze at 25° C. for 10 minutes, 1% of the resin composition passed through the metal gauze.

Comparative Example 5

The resin composition which contained (i) 20% by weight of the fine polymer particles (A) that was obtained from the aqueous latex (L-1) and (ii) 80% by weight of the liquid epoxy resin that was the resin (B) was in liquid form. In a case where this resin composition was placed on an 8-mesh metal gauze at 25° C. for 10 minutes, 90% of the resin composition passed through the metal gauze.

Note that in each of Examples and Comparative Examples, no organic solvent was used during production. Therefore, the amount of an organic solvent remaining in the resin composition was 0 ppm.

According to one or more embodiments of the present invention, it is possible to blend a resin composition with a thermosetting resin and suitably use a resulting mixture in various applications such as adhesive agents and coating materials.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

The invention claimed is:

1. A method of producing a resin composition, comprising:

a washing step of washing the resin composition with water, the resin composition containing:

fine polymer particles (A) which have a graft part that is constituted by a polymer containing, as one or more structural units, the one or more structural units derived from at least one type of monomer selected from the group consisting of aromatic vinyl monomers, vinyl cyanide monomers, and (meth)acrylate monomers; and a resin (B) which is, at 25° C., a liquid having a viscosity of 100 mPa s to 1,000,000 mPa·s, or a semisolid, in a case where a total amount of the fine polymer particles (A) and the resin (B) is regarded as 100% by weight, an amount of the fine polymer particles (A) being 1% by weight to 70% by weight and an amount of the resin (B) being 30% by weight to 99% by weight;

further comprising:

an agglutinating step of obtaining, from a latex, the resin composition as an agglutinate which contains the fine polymer particles (A) and the resin (B), by at least one type of method selected from the group consisting of flocculation with a flocculant, shearing, and freezing;

the agglutinating step is carried out before the washing step;

wherein the agglutinating step includes:

a first agglutinating step of obtaining, from the latex which contains the fine polymer particles (A), an agglutinate which contains the fine polymer particles (A); and a second agglutinating step of obtaining the agglutinate which contains the fine polymer particles (A) and the resin (B), by mixing the resin (B) and the agglutinate which has been subjected to an intermediate washing step, wherein the method does not include a use of an organic solvent.

2. The method as set forth in claim 1, wherein the agglutinating step includes the intermediate washing step of washing, with water, the agglutinate which has been obtained in the first agglutinating step.

3. The method as set forth in claim 1, wherein the washing step includes a step of washing the resin composition with the water by kneading with a kneader or by stirring with a stirrer.

4. The method as set forth in claim 1, wherein the intermediate washing step includes a step of washing the agglutinate which has been obtained in the first agglutinating step, with the water which has a temperature lower than a glass transition temperature of the fine polymer particles (A).

5. The method as set forth in claim 1, wherein a temperature of the water in the washing step is not higher than 60° C.

6. The method as set forth in claim 1, wherein the flocculant is at least one selected from the group consisting of a polymer agglutinant, an aqueous solution of an inorganic acid, an aqueous solution of an inorganic salt, an organic acid, and an organic salt.

* * * * *